United States Patent
Li et al.

(10) Patent No.: US 12,085,650 B2
(45) Date of Patent: Sep. 10, 2024

(54) SYSTEM AND METHOD FOR ROCK MASS STRUCTURE DETECTION AND DANGEROUS ROCK DETECTION

(71) Applicant: SHANDONG UNIVERSITY, Shandong (CN)

(72) Inventors: Shucai Li, Jinan (CN); Liping Li, Jinan (CN); Shaoshuai Shi, Jinan (CN); Hongliang Liu, Jinan (CN); Zongqing Zhou, Jinan (CN); Jing Wang, Jinan (CN); Chengshuai Qin, Jinan (CN); Jie Hu, Jinan (CN); Hongyun Fan, Shandong (CN); Guangyu Yang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 417 days.

(21) Appl. No.: 17/630,336

(22) PCT Filed: Jul. 13, 2020

(86) PCT No.: PCT/CN2020/101665
§ 371 (c)(1),
(2) Date: Jan. 26, 2022

(87) PCT Pub. No.: WO2021/135157
PCT Pub. Date: Jul. 8, 2021

(65) Prior Publication Data
US 2022/0276383 A1    Sep. 1, 2022

(30) Foreign Application Priority Data
Dec. 31, 2019 (CN) .......................... 201911414798.3

(51) Int. Cl.
*G01S 17/89*    (2020.01)
*G01S 17/86*    (2020.01)
(Continued)

(52) U.S. Cl.
CPC .............. *G01S 17/89* (2013.01); *G01S 17/86* (2020.01); *G06T 7/0002* (2013.01); *G06T 7/11* (2017.01);
(Continued)

(58) Field of Classification Search
CPC . G01S 17/89; G01S 17/86; G06T 7/62; G06T 7/11; G06T 7/13; G06T 7/0002;
(Continued)

(56) References Cited

U.S. PATENT DOCUMENTS

2009/0091570 A1 *    4/2009  Paquette ................. A63F 9/083
                                                                 345/423

FOREIGN PATENT DOCUMENTS

CN    108896015 A  *  5/2019
CN    109766894 A     5/2019
(Continued)

OTHER PUBLICATIONS

Oct. 14, 2020 International Search Report issued in International Patent Application No. PCT/CN2020/101665.
(Continued)

*Primary Examiner* — Michael J Dalbo
*Assistant Examiner* — Kaleria Knox
(74) *Attorney, Agent, or Firm* — Oliff PLC

(57) ABSTRACT

A system and method for rock mass structure detection and dangerous rock detection including a rock mass structure automated detection device and a server. The rock mass structure automated detection device includes a three-dimensional laser scanning device and a two-dimensional image acquisition device for respectively acquiring three-dimensional laser point cloud data and a two-dimensional image of a tunnel construction region. The server communicates with the rock mass structure automated detection device and includes a block structure three-dimensional
(Continued)

modeling module and a block structure geometric stability analysis module. By considering the influence of the same group of structural faces in a rock mass, the effect of a newly-generated structural face subjected to blasting disturbance, and the finite dimension of a structural face, blocks in shapes of polygonal pyramid and polygonal frustum can be constructed to comply with engineering practices, and the geometric stability of any polygonal pyramid can be rapidly analyzed.

10 Claims, 7 Drawing Sheets

(51) Int. Cl.
    *G06T 7/00* (2017.01)
    *G06T 7/11* (2017.01)
    *G06T 7/13* (2017.01)
    *G06T 7/62* (2017.01)
    *G06T 17/00* (2006.01)

(52) U.S. Cl.
    CPC .............. *G06T 7/13* (2017.01); *G06T 7/62* (2017.01); *G06T 17/00* (2013.01); *G06T 2207/10028* (2013.01); *G06T 2207/20061* (2013.01); *G06T 2207/20221* (2013.01); *G06T 2210/12* (2013.01); *G06T 2210/21* (2013.01)

(58) Field of Classification Search
    CPC ........... G06T 17/00; G06T 2207/10028; G06T 2207/20061; G06T 2207/20221; G06T 2210/12; G06T 2210/21
    See application file for complete search history.

(56) References Cited

FOREIGN PATENT DOCUMENTS

| CN | 106326636 | A | * | 5/2020 | ............. G06T 17/05 |
|---|---|---|---|---|---|
| CN | 110260785 | A | * | 5/2020 | ............. G01S 17/86 |
| CN | 111145345 | A | | 5/2020 | |
| CN | 111161252 | A | | 5/2020 | |
| CN | 111161414 | A | | 5/2020 | |

OTHER PUBLICATIONS

Oct. 14, 2020 Written Opinion issued in International Patent Application No. PCT/CN2020/101665.

Chengshuai Qin; "Detection and Analysis Method of Exposed Rock Mass Structure and Its Application in Tunnel Engineering"; Chinese Master's Theses Full-Text Database, Engineering Science & Technology II; Sep. 2019; No. 9; ISSN: 1674-0246; pp. C034-C204, chapter 3, chapter 4.

* cited by examiner

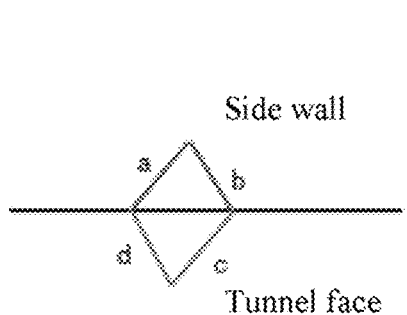
FIG. 8(a)

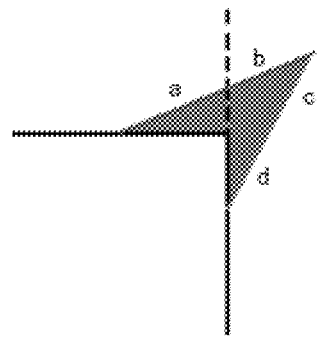
FIG. 8(b)

```
┌─────────────────────────────────────────────────────────────────┐
│ Establish an orthogonal xyz three-axis coordinate system, and    │──S201
│ calculate coordinates of a tunnel axis according to coordinates  │
│ of each vertex of a block                                        │
└─────────────────────────────────────────────────────────────────┘
                              │
                              ▼
┌─────────────────────────────────────────────────────────────────┐
│ Calculate a radial distance between each vertex of the block and │
│ the tunnel axis, screen out a group of vertexes with the shortest│──S202
│ radial distance as vertexes of a free face, and set the remaining│
│ vertexes to be inside a rock mass                                │
└─────────────────────────────────────────────────────────────────┘
                              │
                              ▼
┌─────────────────────────────────────────────────────────────────┐
│ Screen out a vertex with a minimum z-axis value from the vertexes│
│ of the block, determine that the block is a stable block if the  │──S203
│ vertex is inside the rock mass, and determine that the block has │
│ an instability risk if the vertex is on the free face            │
└─────────────────────────────────────────────────────────────────┘
```

FIG. 9

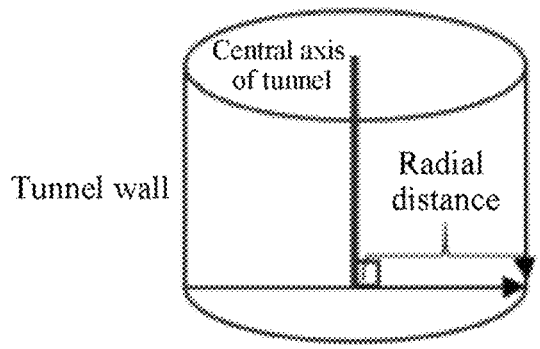

FIG. 10

Coaxially obtain three-dimensional laser point cloud data and a plurality of two-dimensional images of a tunnel construction region, all the two-dimensional images can be spliced into a tunnel construction region panorama image ~S301

Spherically project all the two-dimensional images, directly assign RGB information of pixel points in the two-dimensional images to the three-dimensional laser point cloud data with the same angle, directly splice all the two-dimensional images, and construct a tunnel construction region three-dimensional model ~S302

FIG. 11

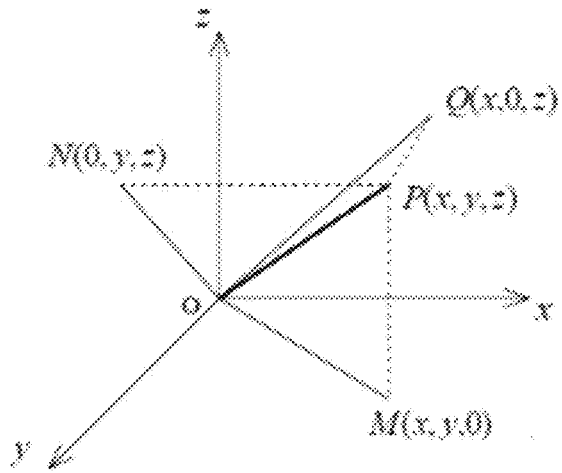

FIG. 12

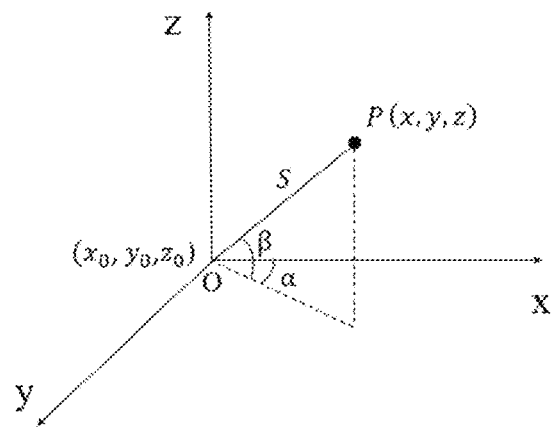

FIG. 13

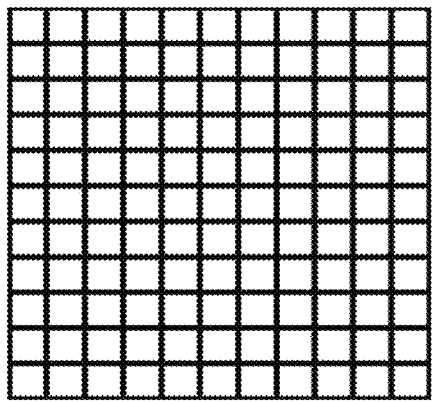
FIG. 14(a)

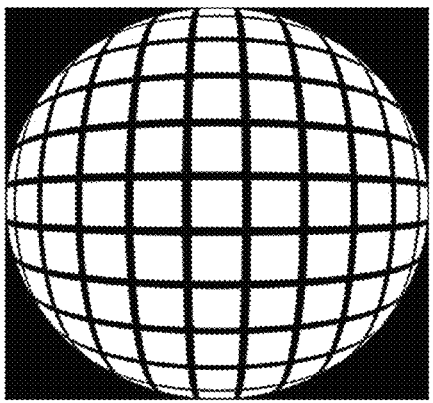
FIG. 14(b)

Receive a panoramic two-dimensional image and three-dimensional laser point cloud data around a rock mass structure

↓

Match and fuse the three-dimensional laser point cloud data and the panoramic two-dimensional image so that all pixel points in the panoramic two-dimensional image correspond to three-dimensional coordinates corresponding to the three-dimensional laser point cloud data one by one

↓

Extract a structural face trace in the panoramic two-dimensional image, identify a corresponding three-dimensional structural face trace in the three-dimensional laser point cloud data according to a corresponding relation of coordinates, and further obtain a length of the three-dimensional structural face trace

↓

Predict a diameter range of the structural face disc according to a probability distribution relation between the diameter of the structural face disc and the length of the three-dimensional structural face trace

↓

Fit the structural face disc by using the three-dimensional structural face trace in the three-dimensional laser point cloud data so that a sum of distances between all points on the structural face trace and the structural face disc is minimum, and finally determine that a plane of the fitted structural face disc is a rock mass structural face and a diameter range of the rock mass structural face is the same as the diameter range of the structural face disc

FIG. 15

SYSTEM AND METHOD FOR ROCK MASS STRUCTURE DETECTION AND DANGEROUS ROCK DETECTION

TECHNICAL FIELD

The present invention belongs to the field of rock mass detection, and in particular to a system and method for rock mass structure detection and dangerous rock detection.

BACKGROUND

The description in this section merely provides background information related to the present invention and does not necessarily constitute the prior art.

The exploration of a rock mass structure is the basic work of geological disaster prediction and early warning in tunnel and underground engineering, which has important guiding significance in underground engineering construction. Geological logging and risk assessment are carried out according to acquired high-precision rock mass structure information, and a rock mass structural face is subjected to extension prediction through rock mass three-dimensional structure information, so that tunnel risk control can be guided to a certain extent by occurrence prediction of dangerous blocks, stability analysis of the dangerous blocks and the like. The dimension, precision, time effect, and other indicators for exploration of the rock mass structure directly affect the effectiveness of construction risk control.

The inventors have found that a current system for rock mass structure detection and dangerous rock detection has the following problems:

1) There are some problems in rock mass structure information acquisition, such as low precision, poor adaptability, complex operation, and difficulty in transportation of support equipment. The data acquisition precision is restricted by professional level and technical literacy of operators, so that the system cannot be popularized on a large scale.

2) For an environment of high dust concentration and uneven illumination conditions in tunnel and underground engineering, existing non-contact acquisition methods cannot be normally applied. At present, after data acquisition is completed, data needs to be returned to a work room for analysis. When an analysis result is obtained, the construction often enters a next cycle, and effective guiding significance cannot be formed for the construction. At present, it is required that people need to carry devices to perform data acquisition under a dangerous region for a long time, rock falling occurs frequently, and the safety of life and property is seriously threatened. Dust, gas, radioactive gas and the like in tunnel and underground engineering have a great influence on the health of people. The measurement of an existing contact method is performed only within a small range which can be touched by people.

3) A traditional rock mass structure method can only identify rock cracks in a two-dimensional image, does not consider the combination of three-dimensional point cloud data and panoramic image data and a relationship between the diameter of a structural face and the length of a structural face trace, and the structural face extends infinitely by default. Moreover, due to great influence of light on a construction site and great influence of a shadow generated by rock protrusion on automatic identification, the identification accuracy is low.

4) A block model construction shape is only a pyramid-shaped block, and the effect of internal structural face tangent is not considered, resulting in deviating from the engineering practice. A block model construction position is mainly at a tunnel face or a slope, and the influence of blasting disturbance at a joint of the tunnel face and a side wall is not considered. The dimensions of the structural face based on which a block is constructed extend infinitely, which do not conform to actual working conditions.

5) A traditional method for analyzing block structure geometric stability is mainly a vector analysis method, which is more effective for a triangular pyramid, but the analysis of special-shaped blocks in the shape of a pentagonal pyramid, including frustum-shaped blocks and oblique frustum-shaped blocks, is huge in calculation and produces multiple solutions, so that the method is not applicable.

SUMMARY

In order to solve the above-described problems, the present invention provides a system for rock mass structure detection and dangerous rock detection. By considering the influence of the same group of structural faces in a rock mass, the effect of a newly-generated structural face subjected to blasting disturbance, and the finite dimension of a structural face, blocks in shapes of polygonal pyramid and polygonal frustum can be constructed to comply with engineering practices, and the geometric stability of any polygonal pyramid can be rapidly analyzed.

To achieve the foregoing objective, the present invention adopts the following technical solutions:

A first aspect of the present invention provides a system for rock mass structure detection and dangerous rock detection, which includes a rock mass structure automated detection device and a server.

The rock mass structure automated detection device is provided with a three-dimensional laser scanning device and a two-dimensional image acquisition device for respectively acquiring three-dimensional laser point cloud data and a two-dimensional image of a tunnel construction region.

The server communicates with the rock mass structure automated detection device.

The server includes a block structure three-dimensional modeling module and a block structure geometric stability analysis module.

The block structure three-dimensional modeling module is configured to:
 construct a plane of a tunnel face;
 select a trace to generate a structural face: selecting a three-point trace, fitting a second three-dimensional plane, and calculating a structural face disc by using half of a diagonal length of an outer bounding box of the trace as a radius and average coordinates of the trace as an origin;
 fit a projection face of a trace group: fitting the projection face of the trace group by using the same group of traces and first two points of each trace;
 determine closeness of a projection line of the trace group:
 projecting the trace to the projection face, determining whether a projection trace group is closed, calculating intersection lines of all structural faces and a trace projection face if the projection trace group is closed, calculating whether there are two intersection points of the trace on a side wall and the tunnel face if the projection trace group is not closed, calculating intersection lines of all the structural faces and the plane of the tunnel face if there are two intersection points, otherwise, re-selecting a trace to generate a structural face; and construct a face with intersection lines: constructing a closed face as a face of a block by using the intersection lines on all the structural faces, the tunnel face, and the trace projection face.

The block structure geometric stability analysis module is configured to:

establish an orthogonal xyz three-axis coordinate system, and calculate coordinates of a tunnel axis according to coordinates of each vertex of the block;

calculate a radial distance between each vertex of the block and the tunnel axis, screen out a group of vertexes with the shortest radial distance as vertexes of a free face, and set the remaining vertexes to be inside a rock mass; and screen out a vertex with a minimum z-axis value from the vertexes of the block, determine that the block is a stable block if the vertex is inside the rock mass, and determine that the block has an instability risk if the vertex is on the free face.

Further, the server further includes a tunnel construction region three-dimensional model construction module, which is configured to:

coaxially obtain three-dimensional laser point cloud data and a plurality of two-dimensional images of the tunnel construction region, all the two-dimensional images being spliced into a tunnel construction region panorama image; and spherically project all the two-dimensional images, directly assign RGB information of pixel points in the two-dimensional images to the three-dimensional laser point cloud data with the same angle, and directly splice all the two-dimensional images to construct a tunnel construction region three-dimensional model.

Further, the server further includes a rock mass structural face automatic identification module, which is configured to:

receive a panoramic two-dimensional image and three-dimensional laser point cloud data around a rock mass structure;

match and fuse the three-dimensional laser point cloud data and the panoramic two-dimensional image so that all pixel points in the panoramic two-dimensional image correspond to three-dimensional coordinates corresponding to the three-dimensional laser point cloud data one by one;

extract a structural face trace in the panoramic two-dimensional image, identify a corresponding three-dimensional structural face trace in the three-dimensional laser point cloud data according to a corresponding relation of coordinates, and further obtain a length of the three-dimensional structural face trace;

predict a diameter range of the structural face disc according to a probability distribution relation between the diameter of the structural face disc and the length of the three-dimensional structural face trace; and fit the structural face disc by using the three-dimensional structural face trace in the three-dimensional laser point cloud data so that a sum of distances between all points on the structural face trace and the structural face disc is minimum, and finally determine that a plane of the fitted structural face disc is a rock mass structural face and a diameter range of the rock mass structural face is the same as the diameter range of the structural face disc.

A second aspect of the present invention provides a detection method of a system for rock mass structure detection and dangerous rock detection, which includes:

respectively acquiring three-dimensional laser point cloud data and a two-dimensional image of a tunnel construction region by using a three-dimensional laser scanning device and a two-dimensional image acquisition device, and transmitting the three-dimensional laser point cloud data and the two-dimensional image to a server; and performing block structure three-dimensional modeling and block structure geometric stability analysis in the server according to the received three-dimensional laser point cloud data and two-dimensional image.

A process of block structure three-dimensional modeling includes: constructing a plane of a tunnel face;

selecting a trace to generate a structural face: selecting a three-point trace, fitting a second three-dimensional plane, and calculating a structural face disc by using half of a diagonal length of an outer bounding box of the trace as a radius and average coordinates of the trace as an origin;

fitting a projection face of a trace group: fitting the projection face of the trace group by using the same group of traces and first two points of each trace;

determining closeness of a projection line of the trace group:

projecting the trace to the projection face, determining whether a projection trace group is closed, calculating intersection lines of all structural faces and a trace projection face if the projection trace group is closed, calculating whether there are two intersection points of the trace on a side wall and the tunnel face if the projection trace group is not closed, calculating intersection lines of all the structural faces and the plane of the tunnel face if there are two intersection points, otherwise, re-selecting a trace to generate a structural face; and constructing a face with intersection lines: constructing a closed face as a face of a block by using the intersection lines on all the structural faces, the tunnel face, and the trace projection face.

A process of block structure geometric stability analysis includes:

establishing an orthogonal xyz three-axis coordinate system, and calculating coordinates of a tunnel axis according to coordinates of each vertex of the block;

calculating a radial distance between each vertex of the block and the tunnel axis, screening out a group of vertexes with the shortest radial distance as vertexes of a free face, and setting the remaining vertexes to be inside a rock mass; and screening out a vertex with a minimum z-axis value from the vertexes of the block, determining that the block is a stable block if the vertex is inside the rock mass, and determining that the block has an instability risk if the vertex is on the free face.

The present invention has the following beneficial effects:

(1) In the present invention, a trace is projected to a projection face. It is determined whether a projection trace group is closed. Intersection lines of all structural faces and a trace projection face are calculated if the projection trace group is closed. Intersection lines of all the structural faces and a plane of a tunnel face are calculated if the projection trace group is not closed. A closed face is constructed as a face of a block by using the intersection lines on all the structural faces, the tunnel face, and the trace projection face. By considering the influence of the same group of structural faces in a rock mass and the finite dimension of a structural face, a constructed block model is complied with engineering practices.

(2) In the present invention, it is also determined whether there are structural faces in the same group as a free face of the block. If there are structural faces in the same group as the free face of the block, a distance between the structural faces in this group is measured, and a frustum-shaped block three-dimensional module is constructed. A frustum height is the distance between the structural faces in this group. Otherwise, a pyramid-shaped or oblique frustum-shaped block three-dimensional module is constructed. By considering the effect of a newly-generated structural face subjected to blasting disturbance, blocks in the shape of polygonal pyramid and polygonal frustum can be constructed to comply with engineering practices.

(3) By means of establishing an orthogonal xyz three-axis coordinate system and calculating coordinates of a tunnel axis according to coordinates of each vertex of the block, a rapid analysis basis of block stability data is obtained, and the geometric stability of any polygonal pyramid can be rapidly analyzed.

(4) By means of calculating a radial distance between each vertex of the block and the tunnel axis, screening out a group of vertexes with the shortest radial distance as vertexes of a free face, and setting the remaining vertexes to be inside a rock mass, an effect of rapidly establishing a geometric topological relation of each vertex of the block is obtained.

(5) By means of screening out a vertex with a minimum z-axis value from the vertexes of the block and determining whether the vertex is on the free face, an effect of rapidly determining whether the block is stable is obtained.

(6) In the present invention, two-dimensional pixel information and three-dimensional laser point cloud data are directly and coaxially obtained, the pixel information is spherically projected, RGB information of pixel points at the same angle is directly assigned to a three-dimensional laser point, and direct splicing is performed. Measurement errors caused by a traditional method based on feature point registration or based on reflector-method manual registration are avoided, and calculation steps are simplified.

(7) In the present invention, based on one-to-one correspondence between all pixel points in a panoramic two-dimensional image and three-dimensional coordinates corresponding to the three-dimensional laser point cloud data, the three-dimensional point cloud data and panoramic two-dimensional image data are combined to automatically identify a rock mass structure by virtue of a coordinate corresponding relation, a three-dimensional structural face trace corresponding to the three-dimensional laser point cloud data can be accurately identified, and the diameter of the structural face is predicted according to a probability distribution relation between the diameter of a structural face disc and a length of the three-dimensional structural face trace. The identified rock mass structural face is more accurate.

(8) In the present invention, a three-dimensional configuration of an automatic rock fracture can be obtained, so that the occurrence of the structural face can be obtained. The shadow interference can be eliminated, so that the accuracy rate of rock mass structure identification is greatly improved.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute any inappropriate limitation to this application.

FIG. 8(a) illustrates a case where traces at a tunnel face and a side wall cannot be closed but can form a closed pattern according to an embodiment of the present invention.

FIG. 8(b) is a schematic view of a block corresponding to a case where traces at a tunnel face and a side wall cannot be closed but can form a closed pattern according to an embodiment of the present invention.

FIG. 9 is a flow chart of a method for analyzing the geometric stability of a block structure according to an embodiment of the present invention.

FIG. 10 illustrates a tunnel orthogonal xyz three-axis coordinate system according to an embodiment of the present invention.

FIG. 11 is a flow chart of a method for constructing a three-dimensional model of a tunnel construction region according to an embodiment of the present invention.

FIG. 12 illustrates a three-dimensional rectangular coordinate system according to an embodiment of the present invention.

FIG. 13 is a calculation diagram of point cloud coordinates according to an embodiment of the present invention.

FIG. 14(a) illustrates a two-dimensional image according to an embodiment of the present invention.

FIG. 14(b) is a schematic view of a spherical projection corresponding to a two-dimensional image according to an embodiment of the present invention.

FIG. 15 is a flow chart of a method for automatically identifying a rock mass structural face according to an embodiment of the present invention.

DETAILED DESCRIPTION

The present invention is further described below by using the embodiments and the accompanying drawings.

It should be noted that the following detailed descriptions are all exemplary and are intended to provide a further understanding of this application. Unless otherwise specified, all technical and scientific terms used herein have the same meaning as commonly understood by a person of ordinary skill in the art to which this application belongs.

Term Explanation

A tunnel face, also called a face, is a term in tunnel construction. The tunnel face is a working face which is continuously advanced by excavating a tunnel (in coal mining, mining, or tunnel engineering).

A structural face refers to a discontinuous face with very low or no tensile strength. The structural face includes all geological separation faces. Different structural faces have different mechanical properties and different sizes.

A free face refers to a boundary face of a free space when a rock mass slides, such as a slope face of a slope, a side wall of a chamber, or a downstream river bed face of a dam foundation.

Figure 20:
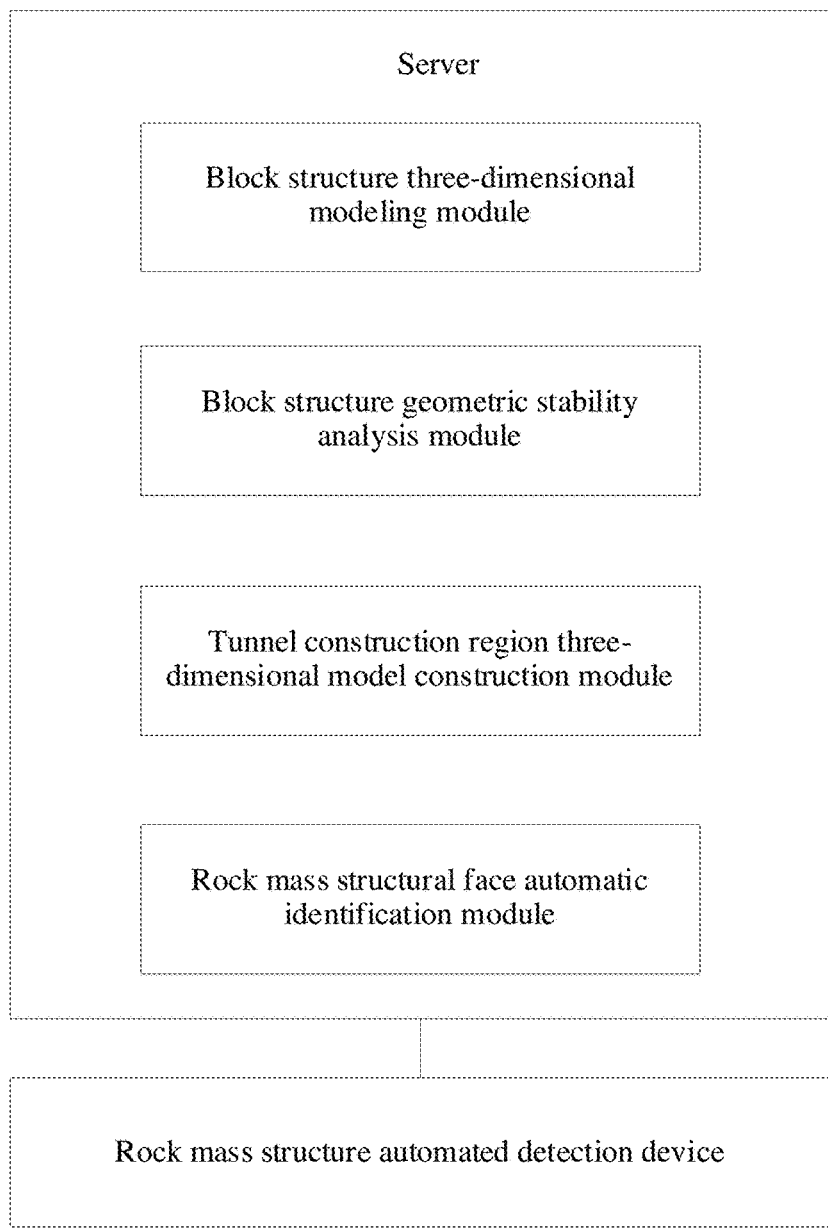
FIG. 20 is a schematic structural view of a system for rock mass structure detection and dangerous rock detection according to an embodiment of the present invention.

As shown in FIG. 20, a system for rock mass structure detection and dangerous rock detection of the present embodiment includes a rock mass structure automated detection device and a server.

The rock mass structure automated detection device is provided with a three-dimensional laser scanning device and a two-dimensional image acquisition device for respectively acquiring three-dimensional laser point cloud data and a two-dimensional image of a tunnel construction region.

The server communicates with the rock mass structure automated detection device.

The server includes a block structure three-dimensional modeling module, a block structure geometric stability analysis module, a tunnel construction region three-dimensional model construction module, and a rock mass structural face automatic identification module.

Specifically, the rock mass structure automated detection device of the present embodiment includes a frame body.

Figure 1:
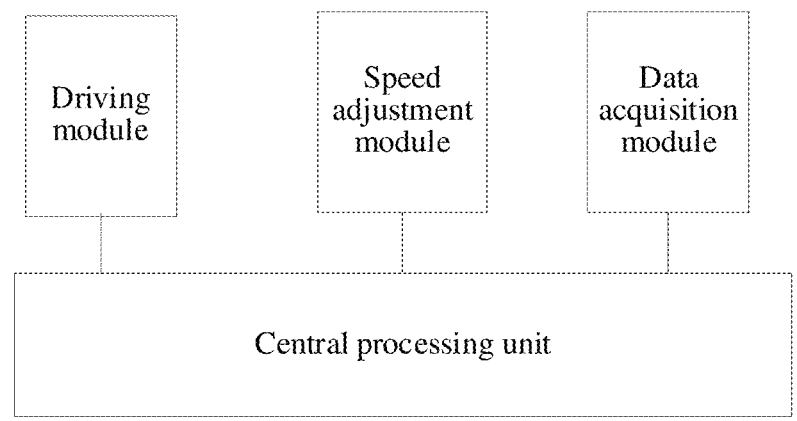
FIG. 1 is a schematic circuit diagram of a rock mass structure automated detection device according to an embodiment of the present invention.

The frame body is provided with a driving module, a speed adjustment module, and a data acquisition module, which are all connected with a central processing unit, as shown in FIG. 1.

In one or more embodiments, a chassis frame is arranged at the bottom of the frame body, and crawler chassis are arranged at both sides of the chassis frame respectively. The crawler chassis includes independent bearing-type chassis suspensions, and the independent bearing-type chassis suspensions are of a Christie+Matilda structure.

Since there are more muddy road sections of tunnel and underground engineering construction sites, and the weight of a device to be carried exceeds 100 kilograms, a wheel-type driving mechanism is poor in road holding, unlikely to rotate in situ, inflexible to move, and complicated in design. In order to guarantee good passing performance of a machine body, a crawler chassis design with strong road condition adaptability is selected in the present embodiment.

A driving motor of the crawler chassis drives a reduction gear, and a chassis driving wheel is driven through a hinge. The driving wheel engages an inner driving wheel hole of a crawler belt to power the crawler belt. The chassis suspensions adopt the design of "Christie+Matilda", are located at both sides of the chassis frame, and are of an independent bearing-type suspension structure.

Figure 2:
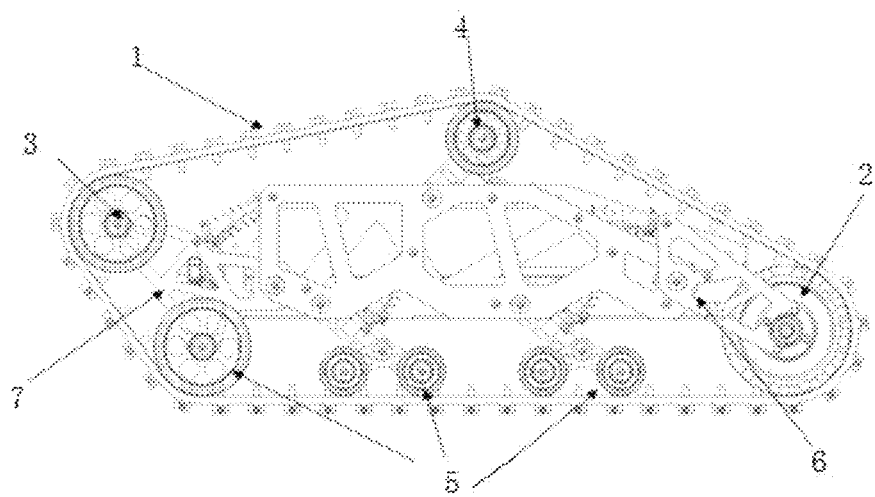
FIG. 2 is a schematic structural view of a crawler chassis according to an embodiment of the present invention.

As shown in FIG. 2, the crawler chassis includes a crawler belt 1. The crawler belt 1 is provided with a chassis suspension. A driving wheel 2, an induction wheel 3, a tensioning wheel 4, and a thrust wheel 5 are arranged on the chassis suspension. The driving wheel 2, the induction wheel 3, the tensioning wheel 4, and the thrust wheel 5 are all attached to an inner side of the crawler belt 1. The driving wheel 2 is connected with the chassis suspension through a first buffer mechanism. The induction wheel 3 is connected with the chassis suspension through a second buffer mechanism. The first buffer mechanism and the second buffer mechanism are both of existing structures and may be implemented by adopting a spring mechanism.

Specifically, the chassis frame is manufactured by welding 304 stainless steel plates with a thickness of 5 mm and is configured to hang a suspension, a driving module, and a lifting mechanism, and fix a platform body sheet metal portion.

The crawler belt is integrally formed by rubber. The rubber crawler belt is a crawler walking component embedded with a certain number of metal and steel cords in a rubber belt. Compared with a metal crawler belt, the rubber crawler belt has the following advantages:

(1) high speed; (2) low noise; (3) small vibration; (4) large traction force; (5) small damage to a road surface; (6) small grounding voltage; (7) light weight of a machine body.

At present, common crawler chassis suspension mechanisms are mainly a Christie suspension and a Matilda suspension. Both suspensions have advantages and disadvantages. The Christie suspension transfers the fluctuation of the road surface to a vertical spring mechanism. The Christie suspension is simple and reliable in structure, good in passing property, but poor in maneuverability. The machine body may swing greatly when passing through a rough road surface, and the safety of precision instruments in the machine body cannot be guaranteed. The Matilda suspension is more complicated and maneuverable than the Christie suspension, but the road vibration filtering capacity is poor, and the safety of the instruments cannot be protected as well.

Since the machine body is provided with precision equipment such as a three-dimensional laser scanner, in order to ensure the safety of the instrument and the large load-carrying capacity, the present embodiment adopts a chassis suspension mechanism in the design of "Christie+Matilda". The chassis suspension mechanism improves the load-carrying capacity of the machine body, the maneuverability can be improved under the muddy and gravel road conditions, the small vibration from the ground can be filtered, the contact area between the crawler belt and the ground can be flexibly adjusted when meeting large fluctuation, so as to increase the road holding.

The rock mass structure automated detection device of the present embodiment can realize safe and stable passing under a complicated road condition environment of a tunnel and underground engineering construction site, and can still ensure good passing property in the face of extreme road conditions such as slipperiness, water accumulation, muddiness, steep slope, narrow bridge, and gravel.

In another embodiment, the driving module is composed of a driving motor, a worm gear reducer, and a chain wheel transmission. The central processing unit is configured to allow the driving motor to drive the worm gear reducer to move by utilizing an S-shaped acceleration curve algorithm. The worm gear reducer drives the crawler chassis to move by the chain wheel transmission. The forward movement, backward movement and steering movement of the rock mass structure automated detection device are realized.

Through the matching of the worm gear reducer and a chain wheel, the torque of a motor is amplified by 45 times, and the climbing and escaping capacities of the machine body are improved.

When the machine body travels, working modes of the motor include a straight operation mode, a turning working mode, and an in-situ rotation working mode.

(1) In the straight operation mode, two motors rotate anticlockwise or clockwise synchronously in different directions at a consistent rotating speed which is determined by a required speed, and a maximum rotating speed is 3000 r/min.

(2) In the turning working mode, two motors rotate oppositely, the rotating speed of an inner motor is reduced in turning, and the rotating speed of an outer motor is increased in turning. A rotating speed change value is determined by a desired turning radius.

(3) In the in-situ rotation working mode, two motors rotate clockwise or anticlockwise synchronously in the same direction at a consistent rotating speed.

In one or more embodiments, the speed adjustment module includes an infrared ranging sensor which is capable of forming a panoramic infrared sensing network. The infrared ranging sensor is configured to sense a terrain height surrounding the frame body relative to a preset horizontal plane and a distance relative to the frame body and transmit the terrain height and the distance to the central processing unit together. The central processing unit is configured to divide a current regional danger level according to the received terrain height relative to the preset horizontal plane and the distance relative to the frame body, and further control the driving module to operate to adjust a traveling speed, so as to realize intelligent traveling.

As dangerous regions such as inverted arches or deep pits need to be poured in tunnel and underground engineering construction sites, the machine body may be directly scrapped if falling. By remotely controlling the machine body to travel, the observation is not comprehensive, the dangerous regions are ignored inevitably, and serious safety threats are caused to the machine body. Large stones and engineering machinery are easy to collide with the machine body in the construction sites, and the safety of the machine body is also threatened if the observation is not timely.

The speed adjustment module forms a panoramic infrared sensing network through six groups of infrared ranging sensors arranged at the periphery of the machine body, senses dangerous regions with the depth of more than 200 mm around the machine body, and monitors the slope of dangerous deep pits. The current region danger level is divided according to the slope of the dangerous region and the position away from the machine body, and the traveling speed is intelligently adjusted according to the danger level to realize intelligent traveling.

TABLE 1

Traveling speed (m/s) of machine body in dangerous region

| Distance | Slope < 20 | 20 < Slope < 30 | Slope > 30 |
|---|---|---|---|
| 100 mm | 6 | 2 | 0 |
| 200 mm | 8 | 6 | 2 |
| 300 mm | 10 | 8 | 3 |
| 400 mm | 12 | 10 | 5 |
| 500 mm | 12 | 12 | 12 |

In another embodiment, an active obstacle avoidance module includes a plurality of ultrasonic sensors. The ultrasonic sensors surround the frame body and are capable of sensing obstacles with heights exceeding a preset height threshold within a preset distance range of the frame body and transmitting position information of the obstacles to the central processing unit in real time. The central processing unit outputs alarm information and outputs an automatic braking instruction to the driving module.

Specifically, the active obstacle avoidance module adopts a full-scene ultrasonic sensing design. Eight groups of ultrasonic sensors are used for sensing obstacles with heights exceeding 200 mm within the range of 500 mm of the machine body. Obstacle position information is transmitted to the central processing unit in real time. The central processing unit sends an alarm to remind an operator to stop. If the operator does not execute the instruction, an execution mechanism takes the measures of automatic braking, whistling and the like, so as to effectively prevent the machine body from being collided and damaged.

In one or more embodiments, the data acquisition module includes an openable and closeable sealed chamber. The chamber is internally provided with a three-dimensional laser scanning device. The three-dimensional laser scanning device is connected with the lifting mechanism, and the lifting mechanism is connected with the central processing unit. The central processing unit is configured to control the lifting mechanism to act, so as to lift the three-dimensional laser scanning device.

Specifically, the three-dimensional laser scanning device is a 5010C-type three-dimensional laser scanner manufactured by Germany Z+F Company. The instrument is one of the most advanced scanning instruments in the world. Compared with other scanners, the instrument has obvious advantages in rock mass structure detection due to the highest scanning speed, a measuring distance of 187 m, and the lightest system weight. The instrument adopts a phase/pulse laser ranging mode, and the measurement precision may reach 0.5 mm. The primary safety laser is used, so that no harm is caused to people. The instrument has a dynamic horizontal compensation function, and can correct an inclination angle of each point in the scanning process within a 1-degree inclination range. A durable aluminum-magnesium alloy shell is adopted for heat dissipation without a traditional heat dissipation fan, so that the damage of dust to the machine body is reduced.

Figure 3:
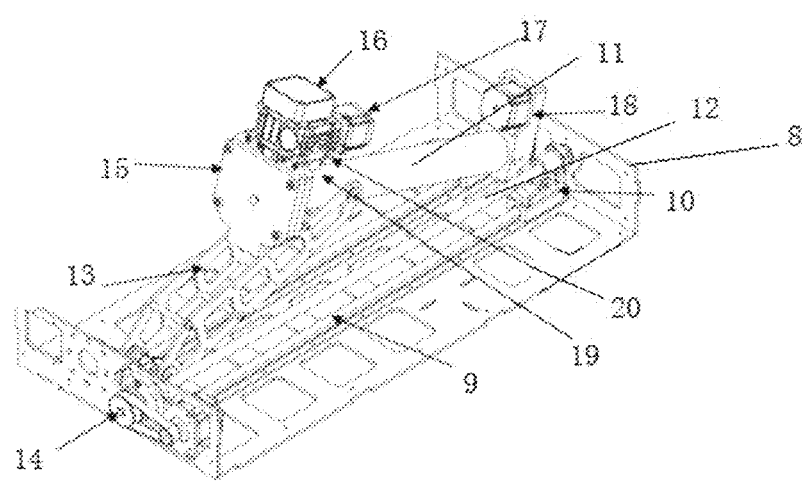
FIG. 3 is a schematic structural view of a lifting mechanism according to an embodiment of the present invention.

Specifically, as shown in FIG. 3, the lifting mechanism includes a lifting base 8.

A guide rail 9 is mounted on the lifting base 8. A sliding block 10 is arranged on the guide rail 9. The sliding block 10 is connected with a lifting rod 11. The three-dimensional laser scanning device is mounted on the lifting rod 11. A ball screw 12 is mounted on the sliding block 10. The other end of the ball screw 12 is also hinged with a support arm 13. The ball screw 12 is connected with a stepping motor 14.

The data acquisition module is the core of the whole system, which takes the task of rock mass structure information acquisition. Since data acquisition instruments are precise and expensive, direct exposure to a severe environment of the tunnel poses great risks to the safety and stability of the instruments. Therefore, the present embodiment adopts an openable and closeable fully-closed chamber for housing the three-dimensional laser scanning device.

In a specific implementation, the sealed chamber includes a chamber body. A chamber door cover is arranged on the chamber body. Sealing devices are additionally arranged at edges of the chamber body and the chamber door cover to ensure the air tightness of the sealed chamber.

In another embodiment, the chamber door cover is divided into a left portion and a right portion, and reinforcing ribs are arranged inside to increase the anti-collision strength. The chamber door cover is also provided with a guide groove for preventing dripping water in a construction tunnel from intruding into a vehicle body when the chamber door cover is closed.

In another embodiment, a shock-absorbing protection layer is arranged in the sealed chamber.

For example, the chamber and a cover plate are designed in a fully-closed structure, adopt a 304 stainless steel sheet metal process with the thickness of 1.5 mm, are sprayed with plastics on the surfaces, and have certain anti-collision and anti-smashing capacities. Rubber sealing strips are additionally arranged at lap joints of steel plates and at edges of the chamber door, so that air tightness is ensured. The design is used for coping with a water seepage environment in tunnel and underground engineering construction sites. The safety of the instrument in the construction site is improved. A melamine foaming sponge is mounted in the chamber to serve as a shock-absorbing protection pad, so that vibration can be buffered and absorbed. The instrument can be partially wrapped when retracted into the chamber, so that the stability of the instrument is guaranteed. Mounting positions of a high-definition infrared patrolling cradle head and part of high-reduction light supplementing devices are reserved above and behind the chamber.

In another embodiment, the data acquisition module further includes a two-dimensional image acquisition device.

The two-dimensional image acquisition device is mounted on the three-dimensional laser scanning device, adopts an automatically adjusted three-level exposure mode, and automatically adjusts white balance according to light intensity.

Relative coordinate centers of the two-dimensional image acquisition device and the three-dimensional laser scanning device are coincided. Coordinates of pixel points of a panoramic image obtained through rotation are directly matched with three-dimensional laser point cloud coordinates without translation and rotation transformation.

For example, the two-dimensional image acquisition device adopts an I-cam camera made by Germany Z+F Company. The camera can shoot 42 photos at different angles and splice the photos to obtain a panoramic image of 80,000,000 pixels. The automatically adjusted three-level exposure mode is adopted. A white balance scheme is automatically adjusted according to light intensity. The two-dimensional image acquisition device can be mounted on the above laser scanner. Relative coordinate centers of a CCD chip of the camera and the scanner are coincided. The coordinates of the pixel points of the panoramic image obtained through rotation are directly matched with the three-dimensional laser point cloud coordinates without translation and rotation transformation. The fusion precision is greatly improved, and the calculation workload is reduced.

In another embodiment, the data acquisition module further includes an illumination compensation module.

The illumination compensation module includes LED lamp panels and flash lamps. The flash lamps are arranged on the frame body in a surrounding manner. The LED lamp panels are connected with a rotating mechanism, and the rotating mechanism is connected with the central processing unit.

For example:

the illumination compensation module is composed of eight LED lamp panels, five sets of high-brightness ultra-high frequency flash lamps, and corresponding transmission mechanisms. The eight LED lamp panels form a double-stage four-way illumination enhancement system and are arranged at an inner side of a chamber cover plate. The illumination enhancement system is exposed when the chamber cover plate is unfolded, while a secondary lamp panel is unfolded. According to environmental requirements, the illumination intensity can be flexibly adjusted, the direction and angle of light supplement are controlled by a motor, a transmission mechanism, a limit sensor and the like, and a multi-brightness multi-angle multi-direction illumination enhancement scheme is realized. The five sets of high-brightness ultra-high frequency flash lamps are fixed at multiple directions of the machine body and respectively irradiate an upper side, a left upper side, a right upper side, and a rear upper side of the machine body, so that the environmental brightness is enhanced, and the external light interference is balanced. When the machine body opens a light supplement system, the light supplement effect of the system on the tunnel face, the upper side, and a side wall is stable, and images can be obtained under the severe environment of the tunnel.

In another embodiment, the data acquisition module further includes a high-definition infrared patrolling module.

In a specific implementation, the high-definition infrared patrolling module is manufactured by modifying an HDH5904-H73-R21 type infrared high-definition ballhead camera. Monitoring ballhead cameras are all mounted in a reverse hanging mode, a camera assembly of the ballhead cameras is mounted reversely, and vertical mounting is realized.

The high-definition infrared patrolling module can flexibly adjust the direction of the camera according to an instruction of a control end, a rotation range is horizontally 0-360 degrees and vertically 0-90 degrees, and the camera can continuously rotate. A lens is a variable 18-focal length optical zoom lens, and an aperture is automatically adjusted. 1080P high-definition true color video signals are transmitted in an environment with good illumination conditions, and automatically switched to 1080P infrared video signals in a dark environment. The high-definition infrared patrolling module is also provided with a wiper to prevent the device from being out of control due to shielding of the camera by tunnel slurry.

In another embodiment, the data acquisition module further includes an automatic balancing module.

The automatic balance module is mounted on a mounting platform 15 of the three-dimensional laser scanning device.

The automatic balance module is composed of a three-dimensional gyroscope, an X-axis leveling mechanism, and a Y-axis leveling mechanism.

The three-dimensional gyroscope is configured to detect a current position of the three-dimensional laser scanning device and transmit the current position to the central processing unit. The central processing unit is configured to calculate an angle to be adjusted after the received current position of the three-dimensional laser scanning device is subjected to Kalman filtering, convert a corresponding angle value, and then control the X-axis leveling mechanism and the Y-axis leveling mechanism respectively, so that the mounting platform of the three-dimensional laser scanning device is stable.

As shown in FIG. 3, the automatic balancing module is composed of a three-dimensional gyroscope 16, an X-axis leveling mechanism 17, and a Y-axis leveling mechanism 18. The X-axis leveling mechanism is located on a scanner mounting platform. A platform rotating shaft is directly driven by the worm gear reducer for control adjustment. A speed ratio of the worm gear reducer is 1:90, a 57 stepping motor is applied for driving, and an adjustment range is ±20°.

The Y-axis leveling mechanism is combined with the lifting mechanism of the machine body, and front and rear balance adjustment is realized through control of a linkage sliding block mechanism.

In a specific implementation, both the X-axis leveling mechanism and the Y-axis leveling mechanism may be implemented by driving.

In another embodiment, the data acquisition module further includes an environment monitoring module.

Specifically, the environment monitoring module monitors the following contents: dust concentration, air humidity, and air temperature.

A Sharp optical dust sensor (GP2Y1010AU0F) adopted for dust concentration monitoring is configured to detect the concentration of dust particles having a diameter of larger than 0.8 μm. Ambient air is drawn through vent holes. Light is disturbed by particles when emitted into the air, and the energy of the light decays. The dust concentration is reflected by a decay rate.

The air humidity and the air temperature are monitored by a DHT11-type digital temperature and humidity sensor. The sensor includes a temperature and humidity composite sensor with calibrated digital signal output, and adopts a specialized digital module acquisition technology and a temperature and humidity sensing technology to ensure reliability and stability. The sensor includes a resistive humidity sensing element and an NTC temperature measuring element, and is connected with a high-performance 8-bit single-chip microcomputer.

The ground of the tunnel and underground engineering construction site is rough and uneven, and the machine body inevitably inclines when reaching a region to be measured. When an inclination range is smaller than 1 degree, the measuring instrument can automatically compensate the angle, but when the inclination range is large, the instrument cannot operate.

A dust concentration monitoring module 19 and a humidity monitoring module 20 are also arranged on the lifting rod 11.

When a laser scanner and a panoramic camera reach designated working positions, an automatic leveling button is pressed at the control end, and an automatic balancing device automatically operates. The central processing unit receives data of a three-axis gyroscope module through asynchronous serial port communication (UART with a baud rate of 9600), and calculates an angle to be adjusted after Kalman filtering. The central processing unit converts a corresponding angle value and then drives two groups of two-phase four-wire stepping motors through a specialized driver for a stepping motor. The scanner platform is stabilized through front-back adjustment of an x axis and left-right adjustment of a y axis. A stepping angle of the stepping motor is 1.8 degrees, the platform can be guaranteed to be stabilized within 0.1 degrees after being subdivided by the driver 32, and an automatic compensation angle range of the instrument is met.

The central processing unit may record data of each step in the above process, and it is ensured that the scanner mounted on the platform cannot collide with the machine body due to an over-large inclination angle through real-time repeated calculation during retraction. A first initial value is saved, and checking is carried out before the scanner is retracted, so that each retraction of a device such as the laser scanner is guaranteed to be accurate.

The rock mass structure automated detection device of the present embodiment integrates the driving module, the speed adjustment module, and the data acquisition module, so that unmanned, intelligent and rapid acquisition of rock mass structural face information is realized.

The data acquisition module of the present embodiment includes an openable and closeable sealed chamber. The chamber is internally provided with the three-dimensional laser scanning device. The three-dimensional laser scanning device is connected with the lifting mechanism. Safety risks of operators and precision instruments are reduced, and the detection accuracy of a rock mass structure is improved. The rock mass structure automated detection device of the present invention saves 83% of manpower per working cycle, saves 80% of a time window, shortens the analysis time of the rock mass structure by 85% or above, and greatly improves the detection efficiency of the rock mass structure.

Figure 4:
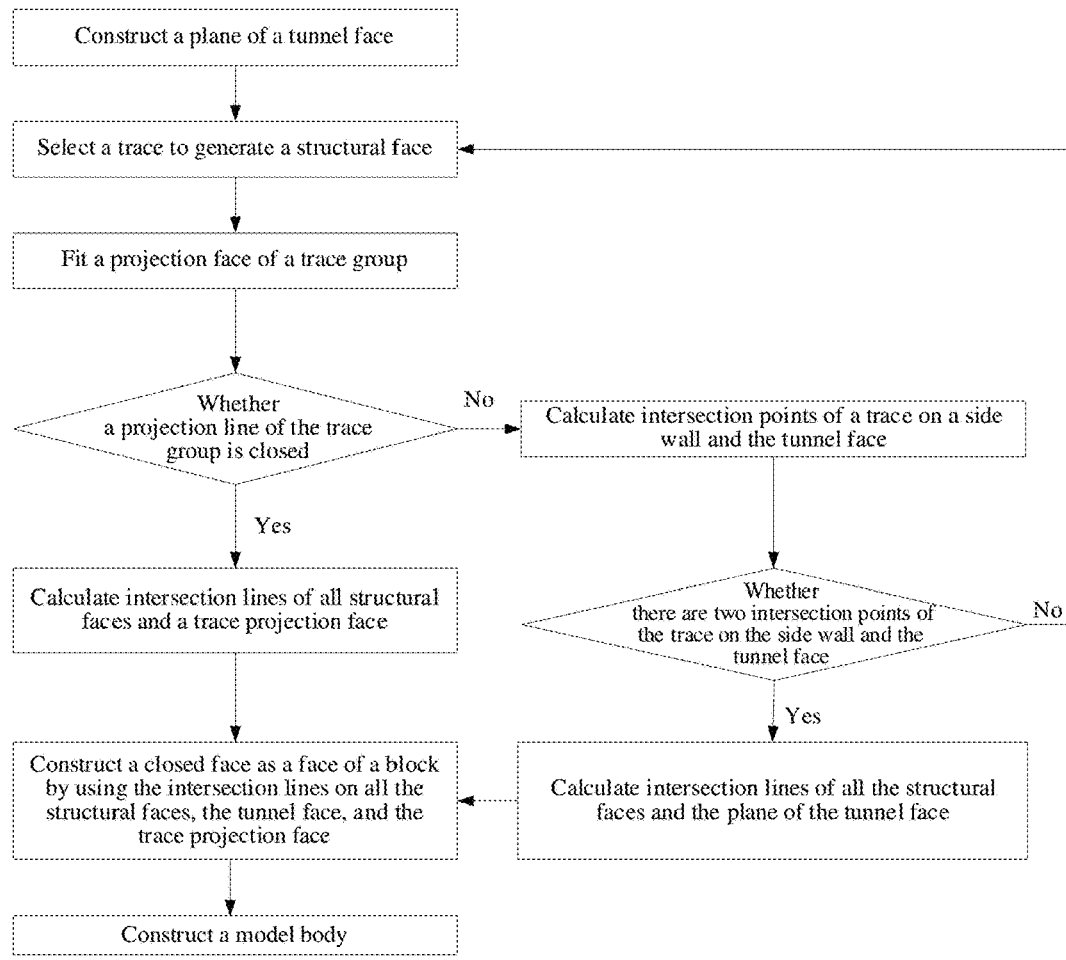
FIG. 4 is a flow chart of a method for three-dimensional modeling of a block structure according to an embodiment of the present invention.

As shown in FIG. 4, the block structure three-dimensional modeling module is configured to perform the following operations.

At S101, a plane of a tunnel face is constructed.

In a specific implementation, the process of constructing the plane of the tunnel face includes the following operations.

Three or more points are selected on a working face, a first three-dimensional plane is fitted, a center point of all the selected points is calculated, and a disc face having a normal vector identical to a normal vector of the first three-dimensional plane is constructed as the tunnel face by taking the center point as an origin and a preset value as a radius.

For example, four points are selected on the working face, and a first three-dimensional plane is fitted to obtain a normal vector N of the first three-dimensional plane. A center point O of the four points selected on the working face is calculated. A disc face having the normal vector N is constructed as the tunnel face by taking the center point O as an origin and Rh as a radius.

It should be noted that, in other embodiments, more than three points are selected on the working surface, and a person skilled in the art may make a choice according to specific working conditions, which is not to be described in detail here.

At S102, a trace is selected to generate a structural face.

In a specific implementation, a three-point trace is selected, a second three-dimensional plane is fitted, and a structural face disc is calculated by using half of a diagonal length of an outer bounding box of the trace as a radius and average coordinates of the trace as an origin.

Specifically, three points of the trace are selected in a sequence that two points of a joint line of the rock mass are selected and then a point on a visible structural face where the joint line is located is selected as a third point in the step of selecting a trace to generate a structural face.

At S103, a projection face of a trace group is fitted.

In a specific implementation, the projection face of the trace group is fitted by using the same group of traces and first two points of each trace.

If there are three traces, there are six points for fitting a plane.

At S104, closeness of a projection line of the trace group is determined.

In a specific implementation, the trace is projected to the projection face. It is determined whether a projection trace group is closed. Intersection lines of all structural faces and a trace projection face are calculated if the projection trace group is closed. It is calculated whether there are two intersection points of the trace on a side wall and the tunnel face if the projection trace group is not closed. Intersection lines of all the structural faces and the plane of the tunnel face are calculated if there are two intersection points. Otherwise, a trace is re-selected to generate a structural face.

Specifically, the operation of determining the closeness of the projection line of the trace group includes the following cases.

(A) Traces on the tunnel face or the side wall can enclose a closed pattern.

Figure 5:
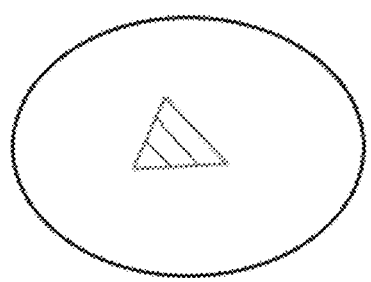
FIG. 5 is a closed pattern enclosed by traces at a tunnel face according to an embodiment of the present invention.
Figure 6:
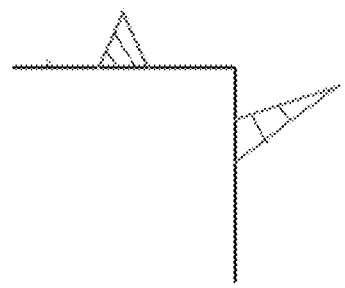
FIG. 6 is a schematic side view of a block enclosed by a tunnel face and a structural face at a side wall according to an embodiment of the present invention.

As shown in FIG. 5, traces at the tunnel face enclose a closed pattern. FIG. 6 shows a side view of a block enclosed by the tunnel face and a structural face at the side wall. In FIGS. 5 and 6, the block is a shaded region.

(B) A trace at the side wall cannot be closed by itself but can be closed by virtue of a trace of a structural face formed by the tunnel face.

Figure 7A:
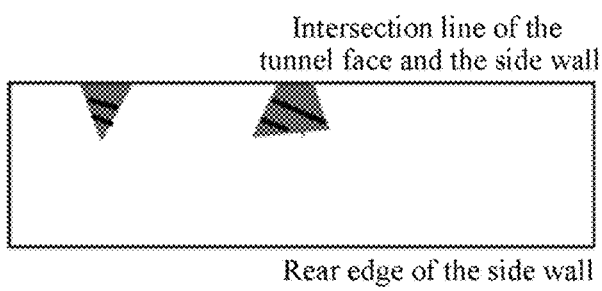
FIG. 7(a) is a schematic expanded view of a side wall in a case where a trace at the side wall cannot be closed by itself but can be closed by virtue of a trace of a structural face formed by a tunnel face according to an embodiment of the present invention.
Figure 7B:
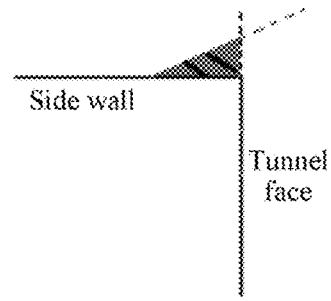
FIG. 7(b) is a schematic view of a block in a case where a trace at a side wall cannot be closed by itself but can be closed by virtue of a trace of a structural face formed by a tunnel face according to an embodiment of the present invention.

FIG. 7(a) is a schematic expanded view of a side wall in a case where a trace at the side wall cannot be closed by itself but can be closed by virtue of a trace of a structural face formed by a tunnel face. FIG. 7(b) is a schematic view of a block corresponding to FIG. 7(a). In this case, the block volume is shown by the shaded area in FIG. 7(b).

(C) A trace at the tunnel face and the side wall cannot be closed but can form a closed pattern.

As shown in FIGS. 8(a) and 8(b), there are two lines a and b at the side wall, there are two lines c and d at the tunnel face, and a, b, c, and d can be connected end to end to form a quadrangle in space, as shown in FIG. 8(a). In this case, the block volume is shown by the shaded area in FIG. 8(b).

At S105, a face is constructed with intersection lines.

In a specific implementation, a closed face is constructed as a face of a block by using the intersection lines on all the structural faces, the tunnel face, and the trace projection face.

In another embodiment, the process of block structure three-dimensional modeling further includes the following operations.

At S106, a model body is constructed.

In a specific implementation, it is determined whether there are structural faces in the same group as a free face of the block. If there are structural faces in the same group as the free face of the block, a distance between the structural faces in this group is measured, and a frustum-shaped block three-dimensional module is constructed. A frustum height is the distance between the structural faces in this group. Otherwise, a pyramid-shaped or oblique frustum-shaped block three-dimensional module is constructed.

Specifically, when the free face is located at the side wall, it can be observed whether a trace parallel to the free face exists in a tunnel face region, and when the free face is located at the tunnel face, it can be observed whether a trace parallel to the free face exists in a side wall region.

If there are the same group of structural faces as the free face, a distance between the structural faces in this group is measured. In this case, the block is a frustum-shaped block, a new plane generated by inward translation of the free face of the original pyramid-shaped or oblique frustum-shaped block cuts a frustum generated by the original pyramid-shaped block. A frustum height is the distance between the structural faces in this group. If there are no the same group of structural faces as the free face, the block is pyramid-shaped or oblique frustum-shaped.

In the present embodiment, it is also determined whether there are structural faces in the same group as the free face of the block. If there are structural faces in the same group as the free face of the block, a distance between the structural faces in this group is measured, and a frustum-shaped block three-dimensional module is constructed. A frustum height is the distance between the structural faces in this group. Otherwise, a pyramid-shaped or oblique frustum-shaped block three-dimensional module is constructed. By considering the effect of a newly-generated structural face subjected to blasting disturbance, blocks in the shape of polygonal pyramid and polygonal frustum can be constructed to comply with engineering practices.

In the present invention, a trace is projected to the projection face. It is determined whether a projection trace group is closed. Intersection lines of all structural faces and a trace projection face are calculated if the projection trace group is closed. Intersection lines of all the structural faces and the plane of the tunnel face are calculated if the projection trace group is not closed. A closed face is constructed as a face of a block by using the intersection lines on all the structural faces, the tunnel face, and the trace projection face. By considering the influence of the same group of structural faces in a rock mass and the finite dimension of a structural face, a constructed block model is complied with engineering practices.

As shown in FIG. 9, in the present embodiment, the process of analyzing the geometric stability of a block structure in the block structure geometric stability analysis module includes the following operations.

At S201, an orthogonal xyz three-axis coordinate system is established, and coordinates of a tunnel axis are calculated according to coordinates of each vertex of the block.

Specifically, an orthogonal three-axis coordinate system is established. A vertical direction is a z axis, and a horizontal direction is an x axis and a y axis. Coordinates of each vertex of the block are obtained in the coordinate system. Coordinates of a tunnel axis are obtained according to an actual position.

For example, the coordinates of each vertex of the block are $(x_k, y_k, z_k)$. k is the kth vertex of the block, and k is a positive integer.

The coordinates of the tunnel axis are $(x_o, y_o, z_o)$.

At S202, a radial distance between each vertex of the block and the tunnel axis is calculated, a group of vertexes with the shortest radial distance are screened out as vertexes of a free face, and the remaining vertexes are set to be inside a rock mass.

Specifically, as shown in FIG. 10, the radial distance refers to a distance from each vertex to a central axis of the tunnel in the orthogonal xyz three-axis coordinate system.

At S203, a vertex with a minimum z-axis value is screened out from the vertexes of the block, it is determined that the block is a stable block if the vertex is inside the rock mass, and it is determined that the block has an instability risk if the vertex is on the free face.

The block is determined to have a direct-falling instability risk when each vertex of the free face surrounds all vertexes inside the rock mass on the horizontal plane under the condition that the block is determined to have an instability risk.

The block is determined to have a sliding instability risk when each vertex of the free face surrounds part of vertexes in the rock mass on the horizontal plane or does not surround any vertex in the rock mass under the condition that the block is determined to have an instability risk.

Two vertexes of a block with a minimum z-axis value and a second minimum z-axis value are screened out under the condition that the block is determined to have a sliding instability risk. The block is determined to have a single-face sliding instability risk if a difference between the z-axis values of the two vertexes is within a preset error tolerance range.

In a specific implementation, the preset error tolerance range is 0-5%.

Two vertexes of a block with a minimum z-axis value and a second minimum z-axis value are screened out under the condition that the block is determined to have a sliding instability risk. The block is determined to have a double-face sliding instability risk if the difference between the z-axis values of the two vertexes is not within the preset error tolerance range.

The method for analyzing the geometric stability of a block structure provided by the present embodiment is used for realizing rock mass structure analysis and disaster-causing huge stone prediction and early warning.

As shown in FIG. 11, the process of constructing a tunnel construction region three-dimensional model in the tunnel construction region three-dimensional model construction module of the present embodiment includes the following operations.

At S301, three-dimensional laser point cloud data and a plurality of two-dimensional images of a tunnel construction region are coaxially obtained. All the two-dimensional images can be spliced into a tunnel construction region panorama image.

The essence of significant optimization in an image gradient domain is to enlarge an image with insignificant difference, enhance edge features of the image by an image interpolation technology, and realize the identification of a structural face trace. However, traditional image interpolation methods, such as nearest neighbor interpolation or linear interpolation, are likely to cause distortion of an image edge, resulting in the sawtooth shape of the structural face trace or trace distortion and the like. A smooth region and a texture region of an image are segmented by using a contour line method. A polynomial model interpolation is applied to the smooth region. A rational function model interpolation is adopted to the texture region. A gradient of the image is then calculated according to a Sobel operator template. Weight optimization is performed according to different texture directions of the image. The defect of distortion of the traditional methods is overcome.

Division thresholds of different regions of the image are four pixel points of an interpolation unit and surrounding pixel points thereof. An average value of the pixel points is taken as a threshold. Different pixel structures have different detection threshold for any data set $f_{i+r,j+s}$ (r, s=−1, 0, 1, 2).

The detection threshold is shown as follows:

$$\lambda = \frac{\sum_{r=-1}^{2}\sum_{s=-1}^{2} f_{i+r,j+s} - \begin{bmatrix} f_{i-1,j-1} & f_{i-1,j+2} \\ f_{i+2,j-1} & f_{i+2,j+2} \end{bmatrix}}{12} \quad (1)$$

The calculation of an image interpolation is to detect image edges in horizontal and vertical directions by using isotropic Sobel operators, and then convolve with an image interpolation plane to solve an image gradient direction. The image gradient direction is perpendicular to a texture direction.

After the image gradient direction is determined, significance optimization is performed on a corresponding center point. A gray value of the center point is estimated according to the mixed weighting of pixel values around the center point of the interpolation unit.

In a specific implementation, the essence of a camera imaging process is that a point in space is converted through the coordinate system and projected to an imaging plane by using a pinhole imaging principle. In the process that the camera obtains pixel information of the rock mass structure, since bending phenomena with different amplitudes are generated in the propagating process of light via the lens, the shot pictures are distorted, and the rock mass structure information is distorted. In a traditional non-contact measurement process of the rock mass structure, a camera is used to directly shoot the tunnel face, and an obtained image taken as the analysis basis of the rock mass structure without correction processing will bring great errors to the analysis of the rock mass structure.

In order to effectively identify the two-dimensional pixel information of the rock mass structure, it is necessary to reduce the distortion as much as possible in the image obtaining process and correct the obtained image. The distortion generated at the image edge is large according to a distortion generation principle. Therefore, as a shot picture is larger, errors caused by distortion are more significant. A two-dimensional pixel information obtaining mode of shooting in a small picture mode and splicing a plurality of small pictures can effectively reduce the distortion. In order to reduce splicing errors, a camera performs three-dimensional rotation by taking the center of an imaging plane as an origin in the shooting process, photos are shot at different inclination angles in the whole space and are corrected, the obtained pixel information is then used for constructing a two-dimensional local coordinate system, and a true color data base of a three-dimensional rock mass structure information model is established.

An i-cam camera is calibrated by using a Zhang's calibration method with a calibration tool developed by CALTECH, and distortion parameters are measured. A black and white grid image with equidistant length and width is displayed in a display, and the display is used as a calibration reference object. A calibration object is shot at different angles for many times, internal and external parameters of the camera are calculated, and calculation formulas are shown as Formulas 2 and 3.

There are five distortion parameters $K_1$, $K_2$, $K_3$, $P_1$, and $P_2$, including radial distortion parameters $K_1$, $K_2$, and $K_3$, and tangential distortion parameters $P_1$ and $P_2$.

Radial Distortion:

$$x_{corrected} = x(1+k_1 r^2 + k_2 r^4 + k_3 r^6)$$

$$y_{corrected} = y(1+k_1 r^2 + k_2 r^4 + k_3 r^6) \quad (2)$$

Tangential Distortion:

$$x_{corrected} = x + [2p_1 xy + p_2(r^2 + 2x^2)]$$

$$y_{corrected} = y + [2p_2 xy + p_1(r^2 + 2y^2)] \quad (3)$$

The calibration tool performs the following simple calculation steps.

(1) Coordinates of an angle point in a calibration plate are extracted for each photo.

(2) Pixel information of the angle point is extracted for each photo.

(3) An internal parameter, an external parameter and a distortion matrix of the camera are solved.

(4) An objective function is minimized.

(5) Statistical evaluation is performed on an average error of a calibration result.

(6) A subsequent image is corrected by applying the calibration result.

The distortion parameters of the i-cam camera are calculated as Formula 4 by calibration software developed by CALTECH:

$$\begin{bmatrix} K_1 \\ K_2 \\ K_3 \\ P_1 \\ P_2 \end{bmatrix} = \begin{bmatrix} -0.3345 \\ 0.2142 \\ 0 \\ -0.0127 \\ 0.0061 \end{bmatrix} \quad (4)$$

After the photo is subjected to distortion correction, cc of each photo is set as an origin, a horizontal direction is set as an x axis, a vertical direction is set as a y axis, and a two-dimensional coordinate system of each photo is established. In the process of obtaining the two-dimensional pixel information of the rock mass structure, the camera takes the center of an imaging plane as an origin to perform three-dimensional rotation shooting with equal focal length. Therefore, the two-dimensional coordinate system of each photo is only subjected to three-dimensional rotation transformation, scaling transformation is not needed, and a unified pixel information local coordinate system can be established. Formulas 6 to 10 are three-dimensional coordinate conversion processes.

A vector $\vec{OP} = (x, y, z)^T$ is set in a three-dimensional coordinate system as shown in FIG. 12 in a three-dimensional rectangular coordinate system. Angles between point P and planes XY, XZ, and YZ are $\theta_x$, $\theta_y$, and $\theta_z$, respectively.

A rotation matrix $R_z(\theta)$ of a rotation angle around the Z axis is:

$$R_z(\theta) = \begin{bmatrix} \cos\theta & -\sin\theta & 0 \\ \sin\theta & \cos\theta & 0 \\ 0 & 0 & 1 \end{bmatrix} \quad (5)$$

A rotation matrix $R_y(\theta)$ of a rotation angle around the Y axis is:

$$R_y(\theta) = \begin{bmatrix} \cos\theta & 0 & \sin\theta \\ 0 & 1 & 0 \\ -\sin\theta & 0 & \cos\theta \end{bmatrix} \quad (6)$$

A rotation matrix $R_x(\theta)$ of a rotation angle around the X axis is:

$$R_x(\theta) = \begin{bmatrix} 1 & 0 & 0 \\ 0 & \cos\theta & -\sin\theta \\ 0 & \sin\theta & \cos\theta \end{bmatrix} \quad (7)$$

A three-dimensional rotation matrix m is:

$$M = R_z(\theta) R_y(\theta) R_x(\theta) \quad (8)$$

Obtain:

$$M = \begin{bmatrix} 1 & 0 & 0 \\ 0 & \cos\theta_x & \sin\theta_x \\ 0 & -\sin\theta_x & \cos\theta_x \end{bmatrix} \begin{bmatrix} \cos\theta_y & 0 & \sin\theta_y \\ 0 & 1 & 0 \\ -\sin\theta_y & 0 & \cos\theta_y \end{bmatrix} \begin{bmatrix} \cos\theta_z & \sin\theta_z & 0 \\ -\sin\theta_z & \cos\theta_z & 0 \\ 0 & 0 & 1 \end{bmatrix} \quad (9)$$

$$M = \begin{bmatrix} \cos\theta_y \cos\theta_z & \cos\theta_y \sin\theta_z & -\sin\theta_y \\ -\cos\theta_x \sin\theta_z + \sin\theta_x \sin\theta_y \cos\theta_z & \cos\theta_x \cos\theta_z + \sin\theta_x \sin\theta_y \sin\theta_z & \sin\theta_x \cos\theta_y \\ \sin\theta_x \sin\theta_z + \cos\theta_x \sin\theta_y \cos\theta_z & -\sin\theta_x \cos\theta_z + \cos\theta_x \sin\theta_y \sin\theta_z & \cos\theta_x \cos\theta_y \end{bmatrix} \quad (10)$$

After three-dimensional rotation of the coordinate system, the x axis of the unified pixel information local coordinate system forms a regular polygon with a rotation origin as the center, and the y axis forms a half regular polygon with the rotation origin as the center. The whole coordinate system forms a pseudo three-dimensional coordinate system with a focal length of the camera as a radius.

The three-dimensional laser scanning device mainly includes a phase laser ranging module and an angle measuring module. The laser ranging module mainly realizes a laser ranging function by a laser emitter, a laser receiver, and a modulator. After emitted from the laser emitter, laser light reaches a rock wall after a certain distance, and then is received by the laser receiver. A distance between the laser emitter and a rock wall measuring point may be expressed as:

$$S = \frac{\phi \cdot c \cdot T}{4\pi} \quad (11)$$

where: S is a distance between a laser ranging emitter and a rock wall measuring point, c is a light propagation speed, and T is a period time of a modulation signal.

After a distance between a laser emitting point and a rock wall is calculated through speed and time, a relative coordinate value of a rock wall point may be solved according to a horizontal rotation angle and a vertical rotation angle of the angle measuring module. As shown in FIG. 13, it is assumed that point O is a laser emitting point with coordinates ($x_0$, $y_0$, $z_0$), point P is a rock wall point with coordinates (x, y, z), $\alpha$ is a drilling rotation angle in a horizontal direction, and $\beta$ is a rotation angle in a vertical direction. A method for solving a relative coordinate value of point P is (Formulas 12-14):

$$x = S \cos \beta \cos \alpha \quad (12)$$

$$zy = S \cos \beta \cos \alpha \quad (13)$$

$$z = S \sin \beta \quad (14)$$

An absolute coordinate value of point P is:

$$\begin{bmatrix} x \\ y \\ z \end{bmatrix} = S = \frac{\phi \cdot c \cdot T}{4\pi} \begin{bmatrix} \cos\beta\cos\alpha & 0 & 0 \\ 0 & \cos\beta\sin\alpha & 0 \\ 0 & 0 & \sin\beta \end{bmatrix} + \begin{bmatrix} x_0 \\ y_0 \\ z_0 \end{bmatrix} \quad (15)$$

Since the tunnel face and the side wall region may have a large-amplitude uneven phenomenon, a laser scanning path may be shielded to a certain extent, and a detection blind region is formed. A cavity is generated in a laser point cloud model. When the above case exists, multi-point detection is needed to eliminate a local detection blind region of the tunnel face and the side wall region, and a scanning contour point cloud is encrypted, so that the fineness and accuracy of obtaining a rock mass structure information form are ensured. A conversion relation of coordinate systems is the key to point cloud splicing of multi-point detection. Two-station detection is taken as an example. It is assumed that one station coordinate system is o-xyz while the other station coordinate system is o'-x'y'z'. In the conversion process, the coordinate system o-xyz is rotated around three coordinate axes of itself, and then o'-x'y'z' is obtained by a translation matrix, which may be represented by Formula (16):

$$\begin{bmatrix} x' \\ y' \\ z' \end{bmatrix} = vR(\alpha, \beta, \gamma) \begin{bmatrix} x \\ y \\ z \end{bmatrix} + T \quad (16)$$

The translation matrix T may be represented by translation quantities $x_o$, $y_o$, and $z_o$ on the three-dimensional coordinate axis:

$$T = \begin{bmatrix} x_0 \\ y_0 \\ z_0 \end{bmatrix} \quad (17)$$

The translation matrix T may be represented by translation quantities $x_o$, $y_o$, and $z_o$ on the three-dimensional coordinate axis:

Formula 17 includes seven parameters: a scale factor, three rotation parameters ($\alpha$, $\beta$, $\gamma$), and three translation parameters ($x_o$, $y_o$, $z_o$). The rock wall does not have a scale change. Therefore, a scale factor V of a coordinate solving process is taken as 1. It is assumed that rotation angles of the coordinate system o-xyz along coordinate axes x, y, and z are $\theta_x$, $\theta_y$, and $\theta$ in sequence, and the coordinate system translates for $x_0$, $y_0$, $z_0$ in sequence along the coordinate axes x, y, and z, and is converted into o'-x'y'z'. The conversions of the rotation matrix along the coordinate axes x, y, and z are as shown in Formulas 5-10.

During the three-dimensional laser scanning of the rock mass structure, horizontal and vertical coordinates of the laser emitting point are both known. That is, the corresponding translation matrix T (Formula 17) is a known quantity, and a rotation adjustment attitude of a laser emitting probe and a corresponding scanning result namely the coordinate axes x, y, and z are known. Therefore, a coordinate conversion relation between two measuring points, i.e., six parameters, may be determined. Thus, point cloud data of a plurality of measuring points may be converted and spliced, and multiple exploration and splicing of rock mass structures in a complicated form are realized.

At S302, all the two-dimensional images are spherically projected, RGB information of pixel points in the two-dimensional images is directly assigned to the three-dimensional laser point cloud data with the same angle, all the two-dimensional images are directly spliced, and the tunnel construction region three-dimensional model is constructed.

As shown in FIGS. 14(a) and 14(b), it is assumed that the x axis of the unified pixel information local coordinate system is a regular n-polygon, the y-axis is half of a regular m-polygon, an image width is w, a height is u, point P with coordinates (x, y) in a rock mass structure trace image identified by a two-dimensional rock mass structure has a projection point P'(R, $\alpha$, $\beta$,) in a coordinate system with a projection sphere radius R, and a chord length is A, then:

$$2\pi R = nw \quad (18)$$

$$\pi R = mu \quad (19)$$

$$\theta = \frac{2\pi R}{n} \quad (20)$$

From the trigonometric cosine law, obtain:

$$A^2 = x^2 + R^2 - 2x \cdot 2R \cdot \cos\left(\frac{\pi - \theta}{2}\right) \quad (21)$$

$$\cos\alpha = \frac{A^2 + R^2 - x^2}{2A \cdot R} \quad (22)$$

$$\alpha = \arccos\left(\frac{R - 2x \cdot \cos\left(\frac{n\pi - 2\pi R}{2n}\right)}{\sqrt{x^2 + R^2 - 2x \cdot 2R \cdot \cos\left(\frac{n\pi - 2\pi R}{2n}\right)}}\right) \quad (23)$$

Similarly, $$\beta = \arccos\left(\frac{R - 2y \cdot \cos\left(\frac{m\pi - \pi R}{2m}\right)}{\sqrt{y^2 + R^2 - 2y \cdot 2R \cdot \cos\left(\frac{m\pi - \pi R}{2m}\right)}}\right) \quad (24)$$

After the above projection transformation (Formulas 20-24), the pseudo three-dimensional coordinate system of pixel data is changed into a smooth spherical coordinate system.

In the three-dimensional laser point cloud data, if coordinates of point M in the point cloud data are set as (x', y', z'), coordinates of point M' in the corresponding spherical coordinate system are set as (r, $\alpha'$, $\beta'$).

$$r = \sqrt{x'^2 + y'^2 + z'^2} \quad (25)$$

$$\alpha' = \arctan\left(\frac{y'}{x'}\right) \quad (26)$$

$$\beta' = \arctan\left(\frac{\sqrt{x'^2 + y'^2}}{z'}\right) \quad (27)$$

The spherical coordinate system where the pixel data is located and the spherical coordinate system where the three-dimensional laser point cloud data is located have a common origin, and the coordinate axes are all in the same direction. Therefore, any point coordinate in the pixel data has only one coordinate in the three-dimensional laser point cloud data corresponding thereto. RGB values in the pixel data and spatial coordinate values in the three-dimensional laser point cloud data are butted under an angle bridge, fusion of the pixel data and the three-dimensional laser point cloud data is realized, the two-dimensional rock mass structure trace is endowed with three-dimensional features, three-dimensional rock mass structure identification is realized, and meanwhile, a high-precision true color three-dimensional tunnel face and side wall model is constructed.

In the present embodiment, two-dimensional pixel information and three-dimensional laser point cloud data are directly and coaxially obtained, the pixel information is spherically projected, RGB information of pixel points at the same angle is directly assigned to a three-dimensional laser point, and direct splicing is performed. Measurement errors caused by a traditional method based on feature point registration or based on reflector-method manual registration are avoided, and calculation steps are simplified.

As shown in FIG. 15, the process of automatically identifying a rock mass structural face in the rock mass structural face automatic identification module of the present embodiment includes the following operations.

At S401, a panoramic two-dimensional image and three-dimensional laser point cloud data around a rock mass structure are received.

Specifically, the slope, the tunnel face, and the side wall around the rock mass structure are shot through a panoramic camera to obtain the panoramic two-dimensional image, and the three-dimensional laser point cloud data is obtained by using a coaxial laser scanning device with panoramic camera shooting.

At S402, the three-dimensional laser point cloud data and the panoramic two-dimensional image are matched and fused so that all pixel points in the panoramic two-dimensional image correspond to three-dimensional coordinates corresponding to the three-dimensional laser point cloud data one by one.

In the present embodiment, in the process of obtaining rock mass structure information, the two-dimensional pixel information and the three-dimensional laser point cloud data are directly and coaxially obtained, the pixel information is spherically projected, RGB information of pixel points at the same angle is directly assigned to a three-dimensional laser point, and direct splicing is performed. Measurement errors caused by a traditional method based on feature point registration or based on reflector-method manual registration are avoided, and calculation steps are simplified.

Figure 16:
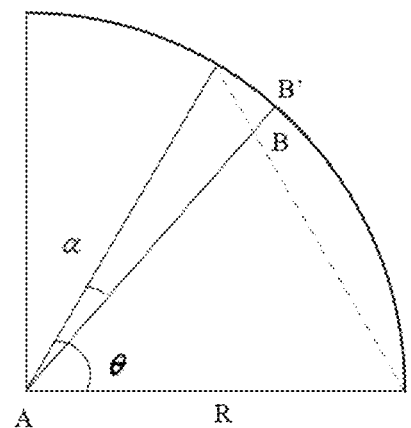
FIG. 16 is a schematic view of a spherical projection of a two-dimensional image according to an embodiment of the present invention.

As shown in FIGS. 14(a) and 14(b), it is assumed that the x axis of the unified pixel information local coordinate system is a regular n-polygon, the y-axis is half of a regular m-polygon, an image width is w, a height is u, point B with coordinates (x, y) in a rock mass structure trace image identified by a two-dimensional rock mass structure has a projection point B'(R, α, β,) in a coordinate system with a projection sphere radius R, and a chord length is A, as shown in FIG. 16, then:

$$2\pi R = nw \tag{28}$$

$$\pi R = mu \tag{29}$$

$$\theta = \frac{2\pi R}{n} \tag{30}$$

θ is a spherical projection angle of a two-dimensional image.
From the trigonometric cosine law, obtain:

$$A^2 = x^2 + R^2 - 2x \cdot 2R \cdot \cos\left(\frac{\pi - \theta}{2}\right) \tag{31}$$

$$\cos\alpha = \frac{A^2 + R^2 - x^2}{2A \cdot R} \tag{32}$$

$$\alpha = \arccos\left(\frac{R - 2x \cdot \cos\left(\frac{n\pi - 2\pi R}{2n}\right)}{\sqrt{x^2 + R^2 - 2x \cdot 2R \cdot \cos\left(\frac{n\pi - 2\pi R}{2n}\right)}}\right) \tag{33}$$

Similarly, $$\beta = \arccos\left(\frac{R - 2y \cdot \cos\left(\frac{m\pi - \pi R}{2m}\right)}{\sqrt{y^2 + R^2 - 2y \cdot 2R \cdot \cos\left(\frac{m\pi - \pi R}{2m}\right)}}\right) \tag{34}$$

After the above projection transformation, the pseudo three-dimensional coordinate system of pixel data is changed into a smooth spherical coordinate system.

In the three-dimensional laser point cloud data, if coordinates of point M in the point cloud data are set as (x', y', z'), coordinates of point M' in the corresponding spherical coordinate system are set as (r, α', β')

$$r = \sqrt{x'^2 + y'^2 + z'^2} \tag{35}$$

$$\alpha' = \arctan\left(\frac{y'}{x'}\right) \tag{36}$$

$$\beta' = \arctan\left(\frac{\sqrt{x'^2 + y'^2}}{z'}\right) \tag{37}$$

Figure 17:
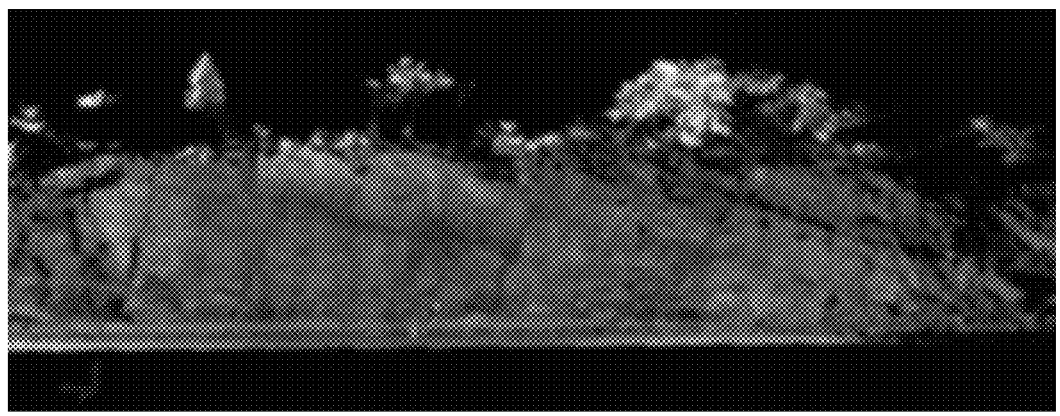
FIG. 17 is a schematic view of fusion of image data and laser point cloud data according to an embodiment of the present invention.

The spherical coordinate system where the pixel data is located and the spherical coordinate system where the three-dimensional laser point cloud data is located have a common origin, and the coordinate axes are all in the same direction. Therefore, any point coordinate in the pixel data has only one coordinate in the three-dimensional laser point cloud data corresponding thereto. RGB values in the pixel data and spatial coordinate values in the three-dimensional laser point cloud data are butted under an angle bridge, fusion of the pixel data and the three-dimensional laser point cloud data is realized, the two-dimensional rock mass structure trace is endowed with three-dimensional features, three-dimensional rock mass structure identification is realized, and meanwhile, a high-precision true color three-dimensional tunnel face and side wall model is constructed. Taking a slope in Binzhou-Laiwu motorway reconstruction and extension project as an example, as shown in FIG. 17, a high-precision true color point cloud model is established by fusing photogrammetry data with three-dimensional laser scanning data.

At S403, a structural face trace in the panoramic two-dimensional image is extracted, a corresponding three-dimensional structural face trace in the three-dimensional laser point cloud data is identified according to a corresponding relation of coordinates, and a length of the three-dimensional structural face trace is further obtained.

Rock mass structure information in a data image is mostly presented as a drastic change portion of the local intensity of the image. Edge detection of a digital image is performed to detect a region in which a gray level in a certain direction changes slowly but a direction perpendicular to the gray level changes sharply in the digital image, so that the rock mass structure information can be automatically detected to a certain extent. After image binarization, denoising, and image gradient domain significant optimization processing, the rock mass structure information is extracted by using an edge detection algorithm, and the detection precision can be effectively improved. The commonly used edge detection operators are Canny, Sobel, LoG, Prewitt and the like, but different operators have different sensitivity to noise, so there are great differences in edge detection and positioning precision in the tunnel environment. After many tests and comparisons, the Canny operator is selected for edge detection.

In a specific implementation, the process of extracting the structural face trace in the panoramic two-dimensional image includes the following operations.

Figure 18:
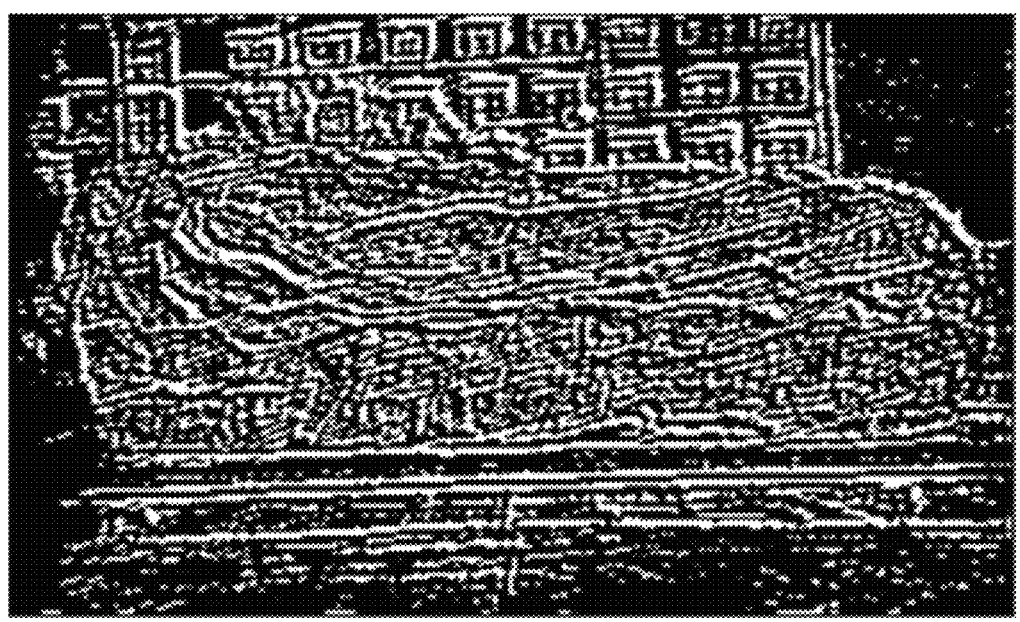
FIG. 18 illustrates an edge detection result according to an embodiment of the present invention.

A Canny operator is selected to detect an edge of the rock mass structure in the panoramic two-dimensional image, the extracted edge is fitted into a straight line through Hough transform, and a linearized structural face trace is formed, as shown in FIG. 18.

In a specific implementation, the length of the three-dimensional structural face trace is calculated according to a distance between two end points of the three-dimensional structural face trace.

The traditional methods of geological logging are a measuring window method, a measuring line method or a semi-measuring line method for a length statistics method of a rock mass structural face trace, which can only estimate the trace length. In addition, a structural face trace length estimated by this method does not take three-dimensional factors into account, and only the structural face trace length on a certain projection plane is estimated. The method for calculating a structural face trace length based on a true color three-dimensional laser point cloud model is adopted, a linear distance between two three-dimensional points of the structural face trace is directly calculated as the structural face trace length, and the result is more accurate.

In the practical application process, two end points of a trace are directly selected through a mouse, and the selection of two points may cause inaccurate results. In order to reduce selection errors, in the two-dimensional true color image data, two end points are selected by means of a two-dimensional structural face trace which is automatically identified, and the previous method for fusing the two-dimensional true color image data and the three-dimensional laser point cloud data is used for converting the two end points into three-dimensional points, so that the selection precision can be effectively improved.

If coordinates of two end points of a structural face trace in a three-dimensional space are $(x_1, y_1, z_1)$, $(x_2, y_2, z_2)$, a structural face trace length l is:

$$l = \sqrt{(x_1-x_2)^2 + (y_1-y_2)^2 + (z_1-z_2)^2} \quad (38)$$

At S404, a diameter range of the structural face disc is predicted according to a probability distribution relation between the diameter of the structural face disc and the length of the three-dimensional structural face trace.

The structural face disc exists in the rock mass, and the form of the structural face disc changes when the rock mass is damaged. Therefore, a real diameter of the structural face disc in the rock mass cannot be actually measured. In most studies of rock mass structures based on block theory, it is assumed that the diameter of the structural face disc is infinitely extended, which is inconsistent with the actual engineering conditions. The present embodiment provides a probability distribution model of a trace length and the diameter of a structural face. Extension scale prediction is performed on the structural face with a known trace length, and the description accuracy of the structural face is improved.

The structural face trace may be considered as the cutting of the structural face disc by a construction excavation face, and is an intersection of the construction excavation face and two planes of the structural face disc. It is possible for the occurrence of a structural face to be distributed according to a certain law, and the construction excavation face is generated along with the construction progress, but since the circle center of the structural face disc is randomly distributed in the rock mass, it can be considered that the structural face trace is generated by the random cutting of the structural face disc by a straight line.

Figure 19:
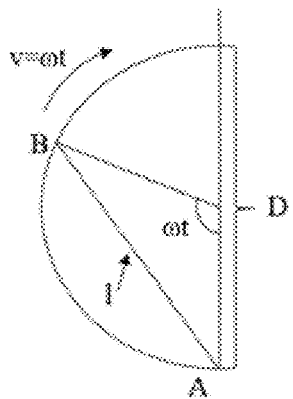
FIG. 19 illustrates a relation between a diameter of a structural face disc and a length of a structural face trace according to an embodiment of the present invention.

A disc in FIG. 19 is set as the structural face disc with a diameter D. A straight line AB randomly cuts the disc, two end points A and B of the straight line can be considered to be located on an edge of the disc, and the two end points move randomly. When the end point A is fixed and the end point B moves randomly at the edge of the disc, the probability distribution condition is the same as that when the two end points move randomly. Also, since the probability that the randomly moving end point B falls on each point of the circumference is the same, it can be considered that the end point B performs uniform circumferential motion on the circumference at a speed of ω. The motion time is t, and the AB length is l. Formulas (39)-(46) are a process of solving a probability density function of the length and diameter of a structural face.

$$K(l|D) = p(x < l) = \frac{\omega t}{\pi} \quad (39)$$

According to a trigonometric function relation, obtain:

$$l = D\sin\frac{\omega t}{2} \quad (40)$$

$$\omega t = 2\arcsin\frac{l}{D} \quad (41)$$

Formula (39) is substituted into Formula (41) to obtain:

$$K(l|D) = p(x < l) = \frac{2\arcsin\frac{l}{D}}{\pi} \quad (42)$$

Then a conditional probability density function is:

$$k(l|D) = \frac{dK(l|D)}{dl} = \frac{2}{\pi\sqrt{D^2 - l^2}} \quad (43)$$

Since the diameter D of the structural face disc is constantly greater than zero, the actual probability density is:

$$g(D) = \frac{Df(D)}{\int_0^{+\infty} Df(D)dD} = \frac{Df(D)}{\mu_D} \quad (44)$$

The probability that a total trace length is greater than l is:

$$L(l)dl = \int_l^{+\infty} g(D)k(l|D)dldD \quad (45)$$

A diameter probability density function is:

$$L(l) = \int_l^{+\infty} g(D)k(l|D)dD = \quad (46)$$

$$L(l)dl = \int_l^{+\infty} \frac{Df(D)}{\mu_D} \cdot \frac{2}{\pi\sqrt{D^2-l^2}} dD = \frac{2}{\pi\mu_D} \int_l^{+\infty} \frac{Df(D)}{\sqrt{D^2-l^2}} dD$$

The probability density function of Formula (46) is substituted into MATLAB for one million random simulations. The diameter of the structural face disc is set as 2, and the generated trace length is divided into ten groups according to an average of 0-2 for statistics, referring to Table 2.

TABLE 2

Structural face trace length probability distribution table

| Trace length | 0-0.2 | 0.2-0.4 | 0.4-0.6 | 0.6-0.8 | 0.8-1.0 | 1.0-1.2 | 1.2-1.4 | 1.4-1.6 | 1.6-1.8 | 1.8-2.0 |
|---|---|---|---|---|---|---|---|---|---|---|
| Probability | 0.01 | 0.03 | 0.05 | 0.07 | 0.09 | 0.11 | 0.13 | 0.15 | 0.17 | 0.19 |

From the analysis in the table, it can be seen that there is an obvious probability distribution relation between the diameter of the structural face and the trace length. As the trace length is closer to the diameter of the structural face disc, the probability is larger. When the diameter of the structural face is approximately equal to the trace length, the probability is 0.19. When the diameter of the structural face is 10 times or above of the trace length, the probability is almost 0. The structural face trace length l and the diameter D of the structural face disc have a relation shown in Formulas (47) and (48):

$$p(l \leq D \leq 3l) = 0.99 \quad (47)$$

$$p(l \leq D \leq 10l) = 0.01 \quad (48)$$

In practical engineering applications, it can be considered that the diameter D of the structural face disc is one to ten times the structural face trace length l, and basically one to three times the structural face trace length l.

At S405, the structural face disc is fitted by using the three-dimensional structural face trace in the three-dimensional laser point cloud data so that a sum of distances between all points on the structural face trace and the structural face disc is minimum, and it is finally determined that a plane of the fitted structural face disc is a rock mass structural face and a diameter range of the rock mass structural face is the same as the diameter range of the structural face disc.

The traditional geological sketch cannot obtain the three-dimensional occurrence of the structural face, but the true color three-dimensional laser point cloud data can truly reflect the three-dimensional features of the rock mass structure, so that the occurrence analysis of the structural face can be performed. It can be seen from the foregoing that the structural face is assumed to be a disc, a three-dimensional equation of a plane of the disc is determined, and the occurrence of the structural face can be obtained. And in engineering practice, an excavated free face cannot be a complete plane. Therefore, a structural face trace exposed by the excavated free face is not a straight line or a line segment, but a curve line segment with three-dimensional features. The plane of the structural face may be fitted according to the three-dimensional features of the structural face trace, a plane three-dimensional equation is calculated, and the occurrence of the structural face is extracted through conversion. A plane three-dimensional equation may be obtained by selecting two end points of the structural face trace and any point between the two points, so the occurrence of the structural face can be estimated. However, in practical engineering, since the structural face is rough, the opening degree is not even, and there is a certain fluctuation. Only three points are used to fit the plane, and a large model reconstruction error will be caused. A plurality of points $\{(x_i, y_i, z_i), i=1, 2, \ldots, n\}$ including a head point and a tail point are selected on the structural face trace, a robust eigenvalue method is adopted, errors are eliminated, and the plane of the structural face is fitted. The process of fitting the plane by the robust eigenvalue method is shown in Formulas (49)-(56).

An equation of the plane of the structural face is:

$$ax+by+cz=d \quad (49)$$

where $a^2+b^2+c^2=1$, $d \geq 0$, and a, b, c, and d are all fitting coefficients.

A distance from a point to the plane of the structural face is:

$$d_i = |ax_i+by_i+cz_i-d| \quad (50)$$

The best fit of the plane of the structural face is a minimum sum K of distances from all points to the plane of the structural face. When the sum of distances is minimum, each parameter is solved as an optimal plane for fitting.

The Lagrange multiplier method is utilized to obtain:

$$\begin{bmatrix} \sum_i \Delta x_i x_i & \sum_i \Delta x_i y_i & \sum_i \Delta x_i z_i \\ \sum_i \Delta x_i y_i & \sum_i \Delta y_i y_i & \sum_i \Delta y_i z_i \\ \sum_i \Delta x_i z_i & \sum_i \Delta y_i z_i & \sum_i \Delta z_i z_i \end{bmatrix} \begin{bmatrix} a \\ b \\ c \end{bmatrix} = \lambda \begin{bmatrix} a \\ b \\ c \end{bmatrix} \text{ If} \quad (51)$$

$$A = \begin{bmatrix} \sum_i \Delta x_i x_i & \sum_i \Delta x_i y_i & \sum_i \Delta x_i z_i \\ \sum_i \Delta x_i y_i & \sum_i \Delta y_i y_i & \sum_i \Delta y_i z_i \\ \sum_i \Delta x_i z_i & \sum_i \Delta y_i z_i & \sum_i \Delta z_i z_i \end{bmatrix} \quad (52)$$

$$x = (a, b, c)^T \text{ Then} \quad (53)$$

$$\lambda = \frac{(Ax, x)}{(x, x)}, \text{ and } x \neq 0, (x, x) = 1 \quad (54)$$

-continued $$K_{min} = \lambda_{min} \quad (55)$$

$$(A - \lambda_{min}I)x = 0 \quad (56)$$

$\lambda_{min}$ is a minimum eigenvalue of the matrix A, and a feature vector corresponding thereto is a vector to be solved.

A robust eigenvalue method is applied to fit the plane, so that reconstruction errors of the plane of the structural face are reduced, and an accurate data base is provided for subsequent block stability analysis.

For an equation ax+by+cz=d of the plane of the structural face, a coordinate system is a right-hand orthogonal coordinate system with the x-axis as a north direction, and z represents an elevation direction.

A strike line equation of the structural face is:

$$ax+by=d \quad (57)$$

Since the inclination line is perpendicular to the strike line, an inclination line equation is:

$$ax-by=e \quad (58)$$

Both d and e are constant coefficients.

The inclination of the structural face is that an angle θ between the inclination line and the north direction (x-axis direction) is:

$$\theta = \arctan\frac{|a|}{|b|} \quad (59)$$

A structural face inclination angle δ is an angle between the structural face and the horizontal plane, and has a value:

$$\delta = \arccos\frac{|c|}{\sqrt{a^2 + b^2 + c^2}} \quad (60)$$

In the present embodiment, based on one-to-one correspondence between all pixel points in the panoramic two-dimensional image and three-dimensional coordinates corresponding to the three-dimensional laser point cloud data, the three-dimensional point cloud data and panoramic two-dimensional image data are combined to automatically identify a rock mass structure by virtue of a coordinate corresponding relation, a three-dimensional structural face trace corresponding to the three-dimensional laser point cloud data can be accurately identified, and the diameter of the structural face is predicted according to a probability distribution relation between the diameter of the structural face disc and the length of the three-dimensional structural face trace. The identified rock mass structural face is more accurate.

In the present embodiment, a three-dimensional configuration of an automatic rock fracture can be obtained, so that the occurrence of the structural face can be obtained. The shadow interference can be eliminated, so that the accuracy rate of rock mass structure identification is greatly improved.

The specific implementations of the present invention are described above with reference to the accompanying drawings, but are not intended to limit the protection scope of the present invention. A person skilled in the art should understand that various modifications or deformations may be made without creative efforts based on the technical solutions of the present invention, and such modifications or deformations shall fall within the protection scope of the present invention.

What is claimed is:

1. A system for rock mass structure detection and dangerous rock detection, comprising:
a rock mass structure automated detection device, provided with a three-dimensional laser scanning device and a two-dimensional image acquisition device for respectively acquiring three-dimensional laser point cloud data and a two-dimensional image of a tunnel construction region; and
a server, communicating with the rock mass structure automated detection device, the server comprising a block structure three-dimensional modeling module and a block structure geometric stability analysis module, wherein the block structure three-dimensional modeling module is configured to: construct a plane of a tunnel face;
select a trace to generate a structural face: selecting a three-point trace, fitting a second three-dimensional plane, and calculating a structural face disc by using half of a diagonal length of an outer bounding box of the trace as a radius and average coordinates of the trace as an origin;
fit a projection face of a trace group: fitting the projection face of the trace group by using the same group of traces and first two points of each trace; determine closeness of a projection line of the trace group:
projecting the trace to the projection face, determining whether a projection trace group is closed, calculating intersection lines of all structural faces and a trace projection face if the projection trace group is closed, calculating whether there are two intersection points of the trace on a side wall and the tunnel face if the projection trace group is not closed, calculating intersection lines of all the structural faces and the plane of the tunnel face if there are two intersection points, otherwise, re-selecting a trace to generate a structural face; and construct a face with intersection lines: constructing a closed face as a face of a block by using the intersection lines on all the structural faces, the tunnel face, and the trace projection face; and
the block structure geometric stability analysis module is configured to: establish an orthogonal xyz three-axis coordinate system, and calculate coordinates of a tunnel axis according to coordinates of each vertex of the block;
calculate a radial distance between each vertex of the block and the tunnel axis, screen out a group of vertexes with the shortest radial distance as vertexes of a free face, and set the remaining vertexes to be inside a rock mass; and
screen out a vertex with a minimum z-axis value from the vertexes of the block, determine that the block is a stable block if the vertex is inside the rock mass, and determine that the block has an instability risk if the vertex is on the free face.

2. The system for rock mass structure detection and dangerous rock detection of claim 1, wherein the server further comprises a tunnel construction region three-dimensional model construction module, the tunnel construction region three-dimensional model construction module is configured to:
coaxially obtain three-dimensional laser point cloud data and a plurality of two-dimensional images of the tunnel construction region, all the two-dimensional images being spliced into a tunnel construction region panorama image; and spherically project all the two-dimensional images, directly assign RGB information of pixel points in the two-dimensional images to the three-dimensional laser point cloud data with the same angle, and directly splice all the two-dimensional images to construct a tunnel construction region three-dimensional model.

3. The system for rock mass structure detection and dangerous rock detection of claim 2, wherein a corresponding two-dimensional image is acquired through three-dimensional rotation with an equal focal length by taking a center of an imaging plane of the two-dimensional image acquisition device as an origin in a process of obtaining a two-dimensional image in the tunnel construction region three-dimensional model construction module;

or before spherically projecting all the two-dimensional images in the tunnel construction region three-dimensional model construction module, the process further comprises:

performing distortion correction on all the two-dimensional images; and after performing distortion correction on all the two-dimensional images, the process further comprises:

segmenting a smooth region and a texture region of each two-dimensional image by using a contour line method, applying a polynomial model interpolation to the smooth region, adopting a rational function model interpolation to the texture region, calculating a gradient of the two-dimensional image according to a Sobel operator template, performing weight optimization according to different texture directions of the two-dimensional image, and enhancing edge features of the two-dimensional image.

4. The system for rock mass structure detection and dangerous rock detection of claim 1, wherein the server further comprises a rock mass structural face automatic identification module, the rock mass structural face automatic identification module is configured to:

receive a panoramic two-dimensional image and three-dimensional laser point cloud data around a rock mass structure;

match and fuse the three-dimensional laser point cloud data and the panoramic two-dimensional image so that all pixel points in the panoramic two-dimensional image correspond to three-dimensional coordinates corresponding to the three-dimensional laser point cloud data one by one;

extract a structural face trace in the panoramic two-dimensional image, identify a corresponding three-dimensional structural face trace in the three-dimensional laser point cloud data according to a corresponding relation of coordinates, and further obtain a length of the three-dimensional structural face trace;

predict a diameter range of the structural face disc according to a probability distribution relation between the diameter of the structural face disc and the length of the three-dimensional structural face trace; and fit the structural face disc by using the three-dimensional structural face trace in the three-dimensional laser point cloud data so that a sum of distances between all points on the structural face trace and the structural face disc is minimum, and finally determine that a plane of the fitted structural face disc is a rock mass structural face and a diameter range of the rock mass structural face is the same as the diameter range of the structural face disc.

5. The system for rock mass structure detection and dangerous rock detection of claim 4, wherein a process of extracting the structural face trace in the panoramic two-dimensional image in the rock mass structural face automatic identification module comprises:

selecting a Canny operator to detect an edge of the rock mass structure in the panoramic two-dimensional image, fitting the extracted edge into a straight line through Hough transform, and forming a linearized structural face trace;

or the length of the three-dimensional structural face trace is calculated according to a distance between two end points of the three-dimensional structural face trace in the rock mass structural face automatic identification module;

or the probability distribution relation between the diameter of the structural face disc and the length of the three-dimensional structural face trace in the rock mass structural face automatic identification module is:

wherein D is the diameter of the structural face disc, l is the length of the three-dimensional structural face trace, and p is probability.

6. The system for rock mass structure detection and dangerous rock detection of claim 1, wherein the rock mass structure automated detection device comprises:

a frame body, provided with a driving module, a speed adjustment module, and a data acquisition module, the driving module, the speed adjustment module, and the data acquisition module being all connected with a central processing unit, wherein the speed adjustment module comprises an infrared ranging sensor capable of forming a panoramic infrared sensing network, the infrared ranging sensor is configured to sense a terrain height surrounding the frame body relative to a preset horizontal plane and a distance relative to the frame body and transmit the terrain height and the distance to the central processing unit together; and the central processing unit is configured to divide a current regional danger level according to the received terrain height relative to the preset horizontal plane and the distance relative to the frame body, and further control the driving module to operate to adjust a traveling speed, so as to realize intelligent traveling; and the data acquisition module comprises an openable and closeable sealed chamber, the chamber is internally provided with the three-dimensional laser scanning device and the two-dimensional image acquisition device, the three-dimensional laser scanning device and the two-dimensional image acquisition device are both connected with a lifting mechanism, the lifting mechanism is connected with the central processing unit, the central processing unit is configured to control the lifting mechanism to act, so as to lift the three-dimensional laser scanning device and the two-dimensional image acquisition device, and the central processing unit communicates with the server.

7. The system for rock mass structure detection and dangerous rock detection of claim 1, wherein the block structure three-dimensional modeling module is further configured to:

construct a model body; and determine whether there are structural faces in the same group as the free face of the block, measure a distance between the structural faces in this group and construct a frustum-shaped block three-dimensional module if there are structural faces in the same group as the free face of the block, a frustum height being the distance between the structural faces in this group, otherwise, construct a pyramid-shaped or oblique frustum-shaped block three-dimensional module;

or a process of constructing the plane of the tunnel face in the block structure three-dimensional modeling module comprises:

selecting three or more points on a working face, fitting a first three-dimensional plane, calculating a center point of all the selected points, and constructing a disc face having a normal vector identical to a normal vector of the first three-dimensional plane as the tunnel face by taking the center point as an origin and a preset value as a radius;

or three points of the trace are selected in a sequence that two points of a joint line of the rock mass are selected and then a point on a visible structural face where the joint line is located is selected as a third point in the step of selecting a trace to generate a structural face in the block structure three-dimensional modeling module;

or the block is determined to have a direct-falling instability risk when each vertex of the free face surrounds all vertexes inside the rock mass on the horizontal plane under the condition that the block is determined to have an instability risk in the block structure geometric stability analysis module.

8. The system for rock mass structure detection and dangerous rock detection of claim 1, wherein in the block structure geometric stability analysis module, the block is determined to have a sliding instability risk when each vertex of the free face surrounds part of vertexes in the rock mass on the horizontal plane or does not surround any vertex in the rock mass under the condition that the block is determined to have an instability risk, two vertexes of a block with a minimum z-axis value and a second minimum z-axis value are screened out under the condition that the block is determined to have a sliding instability risk, and the block is determined to have a single-face sliding instability risk if a difference between the z-axis values of the two vertexes is within a preset error tolerance range;

or in the block structure geometric stability analysis module, the block is determined to have a sliding instability risk when each vertex of the free face surrounds part of vertexes in the rock mass on the horizontal plane or does not surround any vertex in the rock mass under the condition that the block is determined to have an instability risk, two vertexes of a block with a minimum z-axis value and a second minimum z-axis value are screened out under the condition that the block is determined to have a sliding instability risk, and the block is determined to have a double-face sliding instability risk if the difference between the z-axis values of the two vertexes is not within the preset error tolerance range.

9. A detection method of the system for rock mass structure detection and dangerous rock detection of claim 1, comprising:

respectively acquiring three-dimensional laser point cloud data and a two-dimensional image of a tunnel construction region by using a three-dimensional laser scanning device and a two-dimensional image acquisition device, and transmitting the three-dimensional laser point cloud data and the two-dimensional image to a server; and performing block structure three-dimensional modeling and block structure geometric stability analysis in the server according to the received three-dimensional laser point cloud data and two-dimensional image, wherein a process of block structure three-dimensional modeling comprises: constructing a plane of a tunnel face;

selecting a trace to generate a structural face: selecting a three-point trace, fitting a second three-dimensional plane, and calculating a structural face disc by using half of a diagonal length of an outer bounding box of the trace as a radius and average coordinates of the trace as an origin;

fitting a projection face of a trace group: fitting the projection face of the trace group by using the same group of traces and first two points of each trace; determining closeness of a projection line of the trace group:

projecting the trace to the projection face, determining whether a projection trace group is closed, calculating intersection lines of all structural faces and a trace projection face if the projection trace group is closed, calculating whether there are two intersection points of the trace on a side wall and the tunnel face if the projection trace group is not closed, calculating intersection lines of all the structural faces and the plane of the tunnel face if there are two intersection points, otherwise, re-selecting a trace to generate a structural face; and constructing a face with intersection lines: constructing a closed face as a face of a block by using the intersection lines on all the structural faces, the tunnel face, and the trace projection face; and a process of block structure geometric stability analysis comprises: establishing an orthogonal xyz three-axis coordinate system, and calculating coordinates of a tunnel axis according to coordinates of each vertex of the block; calculating a radial distance between each vertex of the block and the tunnel axis, screening out a group of vertexes with the shortest radial distance as vertexes of a free face, and setting the remaining vertexes to be inside a rock mass; and screening out a vertex with a minimum z-axis value from the vertexes of the block, determining that the block is a stable block if the vertex is inside the rock mass, and determining that the block has an instability risk if the vertex is on the free face.

10. The detection method of the system for rock mass structure detection and dangerous rock detection of claim 9, wherein a process of constructing a tunnel construction region three-dimensional model in the server comprises: coaxially obtaining three-dimensional laser point cloud data and a plurality of two-dimensional images of the tunnel construction region, all the two-dimensional images being spliced into a tunnel construction region panorama image; and spherically projecting all the two-dimensional images, directly assigning RGB information of pixel points in the two-dimensional images to the three-dimensional laser point cloud data with the same angle, and directly splicing all the two-dimensional images to construct the tunnel construction region three-dimensional model;

or a process of performing rock mass structural face automatic identification in the server comprises:

receiving a panoramic two-dimensional image and three-dimensional laser point cloud data around a rock mass structure;

matching and fusing the three-dimensional laser point cloud data and the panoramic two-dimensional image so that all pixel points in the panoramic two-dimensional image correspond to three-dimensional coordinates corresponding to the three-dimensional laser point cloud data one by one;

extracting a structural face trace in the panoramic two-dimensional image, identifying a corresponding three-dimensional structural face trace in the three-dimensional laser point cloud data according to a corresponding relation of coordinates, and further obtaining a length of the three-dimensional structural face trace;

predicting a diameter range of the structural face disc according to a probability distribution relation between the diameter of the structural face disc and the length of the three-dimensional structural face trace; and fitting the structural face disc by using the three-dimensional structural face trace in the three-dimensional laser point cloud data so that a sum of distances between all points on the structural face trace and the structural face disc is minimum, and finally determining that a plane of the fitted structural face disc is a rock mass structural face and a diameter range of the rock mass structural face is the same as the diameter range of the structural face disc.

* * * * *